United States Patent
Fang et al.

(10) Patent No.: US 11,567,620 B1
(45) Date of Patent: Jan. 31, 2023

(54) TOUCH MODULE AND TOUCH DEVICE

(71) Applicant: TPK Advanced Solutions Inc., Fujian (CN)

(72) Inventors: Kuo Lung Fang, Hsinchu County (TW); Yamei Chen, Xiamen (CN); Qibin Liu, Xiamen (CN); Chiajui Lin, Taoyuan (TW); Deng Wu, Macheng (CN); Ruibin Yang, Fujian Province (CN); Peiqin Xu, Fujian Province (CN); Chun-An Wei, New Taipei (TW); Jun-Rong Chen, Hsinchu County (TW); You-Zhi She, Xiamen (CN); Yating Hsu, Yunlin County (TW); Baolin Liu, Xiamen (CN); Yongjin Wu, Jian'ou (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/367,680

(22) Filed: Jul. 6, 2021

(51) Int. Cl.
*G06F 3/044* (2006.01)

(52) U.S. Cl.
CPC .......... *G06F 3/0446* (2019.05); *G06F 3/0443* (2019.05); *G06F 2203/04111* (2013.01); *G06F 2203/04112* (2013.01)

(58) Field of Classification Search
CPC .... G06F 2203/041–04114; G06F 2203/04111; G06F 2203/04112; G06F 3/041–0448; H01L 27/323
See application file for complete search history.

(56) References Cited

U.S. PATENT DOCUMENTS

| | | | | |
|---|---|---|---|---|
| 2016/0266685 | A1* | 9/2016 | Haga | G06F 3/0446 |
| 2018/0149920 | A1* | 5/2018 | Yamazaki | G02F 1/1343 |
| 2019/0243486 | A1* | 8/2019 | Zhang | G06F 3/0412 |
| 2020/0081579 | A1* | 3/2020 | Wang | G06F 3/0443 |

(Continued)

FOREIGN PATENT DOCUMENTS

| | | |
|---|---|---|
| TW | M506321 U | 8/2015 |
| TW | I557604 B | 11/2016 |

(Continued)

OTHER PUBLICATIONS

KR-20170112570-A, Choi, 2017, Korea (Year: 2017).*

*Primary Examiner* — Sanjiv D. Patel
(74) *Attorney, Agent, or Firm* — Cooper Legal Group, LLC

(57) ABSTRACT

A touch module includes a substrate, a first horizontal touch electrode, a second horizontal touch electrode, a first jumper, and a first vertical touch electrode. The first horizontal touch electrode and the second horizontal touch electrode are disposed on the substrate at intervals along a first direction. The first jumper is connected to the first horizontal touch electrode and the second horizontal touch electrode, and has a first main portion and at least two first extending portions, in which the first main portion is between the two first extending portions in the first direction. The two first extending portions are respectively disposed corresponding to the first horizontal touch electrode and the second horizontal touch electrode. The first vertical touch electrode is disposed on the substrate, located between the first horizontal touch electrode and the second horizontal touch electrode in the first direction, and is electrically insulated from the first jumper.

20 Claims, 18 Drawing Sheets

(56) References Cited

U.S. PATENT DOCUMENTS

2020/0089352 A1\* 3/2020 Kwon .................. G06F 3/0445
2020/0091247 A1\* 3/2020 Lee ..................... H01L 27/3244
2021/0191557 A1\* 6/2021 Jin ....................... G06F 3/0443

FOREIGN PATENT DOCUMENTS

| TW | I597646 B | 9/2017 |
| TW | I620110 B | 4/2018 |
| TW | M608486 U | 3/2021 |

\* cited by examiner

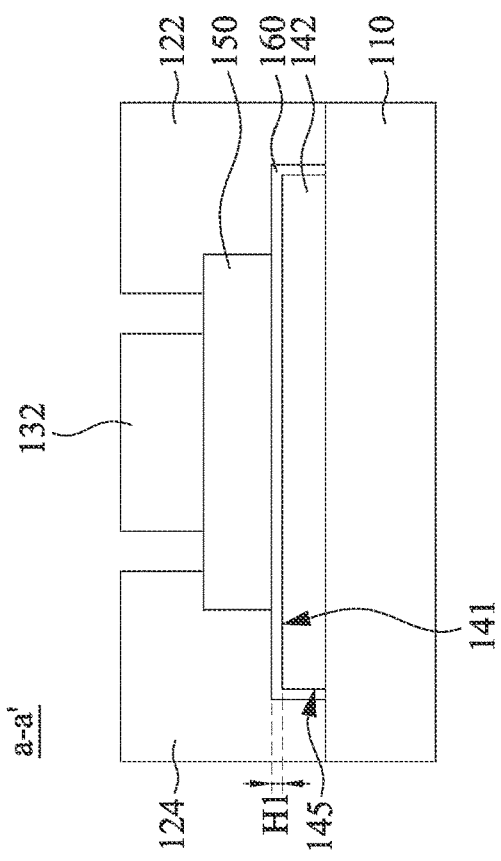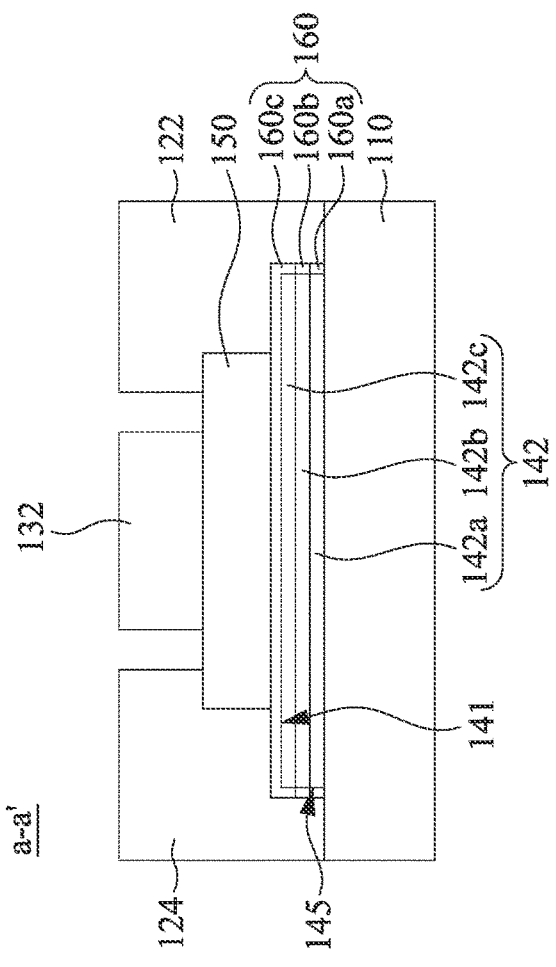

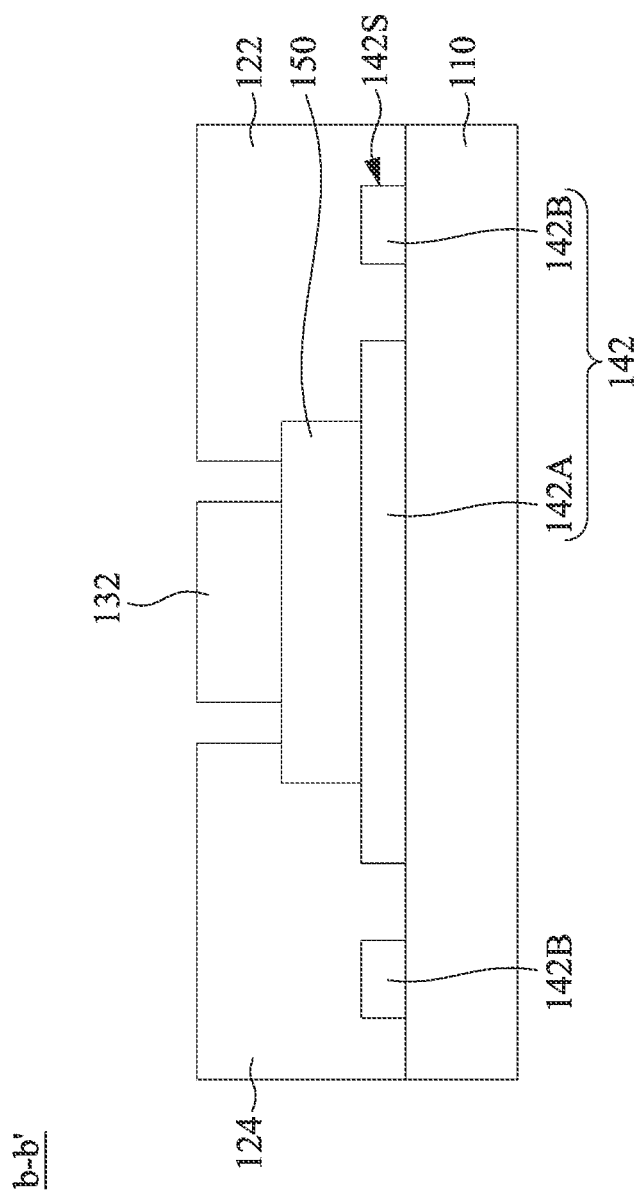

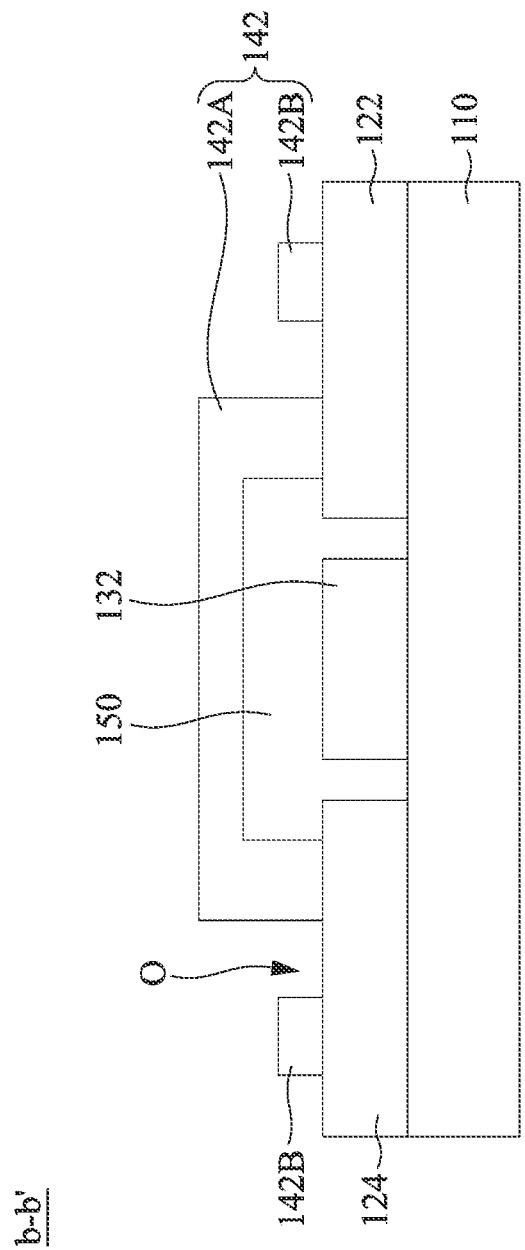

TOUCH MODULE AND TOUCH DEVICE

BACKGROUND

Field of Disclosure

The present disclosure relates to a touch module and a device including the touch module.

Description of Related Art

In recent years, as touch technology has developed, transparent conductors have often been applied in many display or touch-related devices since transparent conductors can allow light to pass through while providing proper conductivity. In general, the transparent conductors may be various metal oxides, such as indium tin oxide (ITO), indium zinc oxide (IZO), cadmium tin oxide (CTO), or aluminum-doped zinc oxide (AZO). However, films made of these metal oxides cannot meet the requirements for flexibility of display devices. Therefore, a variety of flexible transparent conductors, such as a transparent conductor made of a material such as metal nanowires, have been developed nowadays.

However, there are still many problems to be solved for display or touch devices made of metal nanowires. For example, when the metal nanowires are used to make a touch electrode and the metal or metal oxide is used to make a jumper connected to the touch electrode, the contact impedance between the touch electrode and the jumper cannot meet specification requirements because the metal nanowires are distributed in the touch electrode in a form of filaments. When the contact area between the jumper and the touch electrode is increased by increasing the volume of the ends of the jumper, a portion where the jumper overlaps the touch electrode is easily seen by a user when a touch display device is in operation, thus affecting the visual clarity of the touch display device. In addition, when the metal nanowires in the touch electrode are in contact with the jumper made of metal, the metal nanowires easily gather and accumulate, causing low reliability of the metal nanowires and thus resulting in a short or open circuit of the touch device.

SUMMARY

According to some embodiments of the present disclosure, the touch module includes a substrate, a first horizontal touch electrode, a second horizontal touch electrode, a first jumper, and a first vertical touch electrode. The first horizontal touch electrode and the second horizontal touch electrode are disposed on the substrate at intervals along a first direction. The first jumper is connected to the first horizontal touch electrode and the second horizontal touch electrode, and the first jumper has a first main portion and at least two first extending portions connected to the first main portion. The first main portion is between the two first extending portions in the first direction. The two first extending portions are respectively disposed corresponding to the first horizontal touch electrode and the second horizontal touch electrode, and each of the first extending portions forms at least one opening. The first vertical touch electrode is disposed on the substrate, located between the first horizontal touch electrode and the second horizontal touch electrode in the first direction, and electrically insulated from the first jumper.

In some embodiments of the present disclosure, the opening is a closed through hole, and a top-view outline of the closed through hole includes a triangle, a rectangle, a circle, an oval, a polygon, or combinations thereof.

In some embodiments of the present disclosure, each of the first horizontal touch electrode and the second horizontal touch electrode has at least a portion extending to a sidewall of a corresponding one of the two first extending portions.

In some embodiments of the present disclosure, each of a width of the first main portion and a width of each of the first extending portions respectively ranges from 5 µm to 30 µm, and a contact area between the first horizontal touch electrode or the second horizontal touch electrode and a corresponding one of the two first extending portions ranges from 0.01 mm$^2$ to 0.30 mm$^2$.

In some embodiments of the present disclosure, each of the first horizontal touch electrode and the second horizontal touch electrode includes a matrix and a plurality of metal nanowires distributed in the matrix.

In some embodiments of the present disclosure, each of the first horizontal touch electrode and the second horizontal touch electrode is separated from the first vertical touch electrode by at least a gap, a width of the gap ranges from 20 µm to 30 µm, and a wire diameter of each of the metal nanowires ranges from 10 nm to 40 nm.

In some embodiments of the present disclosure, each of the first horizontal touch electrode and the second horizontal touch electrode has a grid pattern formed by interlacing a plurality of electrode lines.

In some embodiments of the present disclosure, a width of each of the electrode lines ranges from 20 µm to 50 µm, and a distance between any two adjacent electrode lines of the electrode lines ranges from 20 µm to 30 µm.

In some embodiments of the present disclosure, at least one edge of each of the two first extending portions has a shape of a chamfer, an inverted arc, a circular arc, or a combination thereof.

In some embodiments of the present disclosure, a material of the first jumper includes at least a metal, and the touch module further includes an oxide layer covering at least one surface of the first jumper.

In some embodiments of the present disclosure, a material of the substrate includes alkali glass, and the touch module further includes an isolation layer disposed between the substrate and the first horizontal touch electrode and between the substrate and the second horizontal touch electrode.

In some embodiments of the present disclosure, the touch module further includes a third horizontal touch electrode, a second jumper, and a second vertical touch electrode. The third horizontal touch electrode is disposed on the substrate at an interval from the second horizontal touch electrode along the first direction. The second jumper is connected to the second horizontal touch electrode and the third horizontal touch electrode, and the second jumper has a second main portion and at least two second extending portions connected to the second main portion. The second main portion is located between the two second extending portions in the first direction, and the two second extending portions are respectively disposed corresponding to the second horizontal touch electrode and the third horizontal touch electrode. Each of the two second extending portions forms at least one opening, and the first extending portion and the second extending portion corresponding to the second horizontal touch electrode are mutually connected. The second vertical touch electrode is disposed on the substrate, located between the second horizontal touch electrode and the third horizontal touch electrode in the first direction, and electrically insulated from the second jumper.

According to some embodiments of the present disclosure, the touch module includes a substrate, a first horizontal touch electrode, a second horizontal touch electrode, a first jumper, and a first vertical touch electrode. The first horizontal touch electrode and the second horizontal touch electrode are disposed on the substrate at intervals along a first direction. The first jumper is connected to the first horizontal touch electrode and the second horizontal touch electrode, and the first jumper has at least one edge which has a shape of a chamfer, an inverted arc, a circular arc, or a combination thereof. The first vertical touch electrode is disposed on the substrate, located between the first horizontal touch electrode and the second horizontal touch electrode in the first direction, and electrically insulated from the first jumper.

In some embodiments of the present disclosure, each of the first horizontal touch electrode and the second horizontal touch electrode has a grid pattern formed by interlacing a plurality of electrode lines, and each of the electrode lines includes a matrix and a plurality of metal nanowires distributed in the matrix.

In some embodiments of the present disclosure, each of the first horizontal touch electrode and the second horizontal touch electrode is separated from the first vertical touch electrode by at least a gap, a width of the gap ranges from 20 μm to 30 μm, and a wire diameter of each of the metal nanowires ranges from 10 nm to 40 nm.

In some embodiments of the present disclosure, a material of the first jumper includes at least a metal, and the touch module further includes an oxide layer covering at least one surface of the first jumper.

In some embodiments of the present disclosure, a material of the substrate includes alkali glass, and the touch module further includes at least one isolation layer disposed between the substrate and the first horizontal touch electrode and between the substrate and the second horizontal touch electrode.

In some embodiments of the present disclosure, a width of the first jumper ranges from 5 μm to 30 μm.

In some embodiments of the present disclosure, the touch module further includes an insulating layer disposed between the first horizontal touch electrode and the first jumper and between the second horizontal touch electrode and the first jumper.

In some embodiments of the present disclosure, a touch device includes the touch module described above.

According to the aforementioned embodiments of the present disclosure, the touch module of the present disclosure includes the touch electrode and the jumper that are mutually connected. By a special design in the structure of the jumper, metal nanowires in the touch electrode can be avoided from excessively gathering or settling near the jumper, and the low contact impedance and optical visibility requirements of the touch module can be met, thus improving the reliability of the touch module and a device manufactured thereby and further meeting product specifications.

BRIEF DESCRIPTION OF THE DRAWINGS

The disclosure can be more fully understood by reading the following detailed description of the embodiments, with reference made to the accompanying drawings as follows:

FIG. 3A is a schematic cross-sectional view of the touch module in FIG. 1A according to some embodiments of the present disclosure, in which a section position is identical to the section position of the line segment a-a';

FIG. 3B is a schematic cross-sectional view of the touch module in FIG. 1A according to some other embodiments of the present disclosure, in which a section position is identical to the section position of the line segment a-a';

FIG. 5B is a schematic cross-sectional view of the touch module in FIG. 5A taken along a line segment b-b';

FIG. 5C is a schematic cross-sectional view of the touch module in FIG. 5A according to some other embodiments of the present disclosure, in which a section position is identical to a section position of the line segment b-b';

DETAILED DESCRIPTION

Figure 1A:
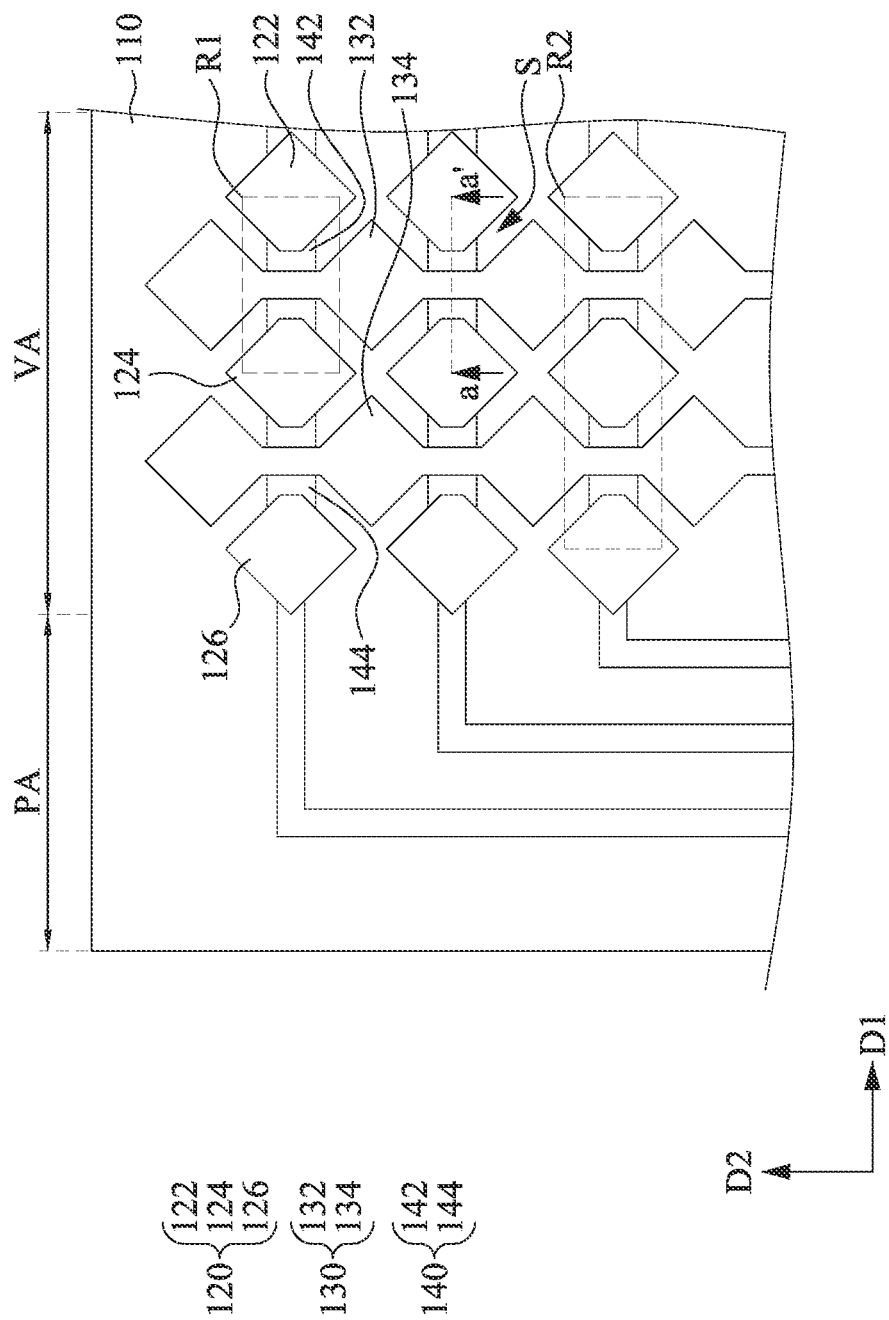
FIG. 1A is a schematic top view of a touch module according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It should be understood that although the terms "first", "second", and "third" may be used herein to describe various elements, components, regions, layers, and/or portions, these elements, components, regions, layers, and/or portions should not be restricted by these terms. These terms are only used to distinguish one element, component, region, layer, or portion from another element, component, region, layer, or portion. Therefore, the "first element", "component", "region", "layer", or "portion" described below can also be referred to as a second element, component, region, layer, or portion without departing from the teachings the present disclosure.

In addition, relative terms such as "lower" or "bottom" and "upper" or "top" can be used herein to describe the relationship between one element and another element, as shown in the figures. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

The present disclosure provides a touch module and a touch device including the touch module, in which the touch module includes touch electrodes and jumpers mutually connected. By a special design in the structure of the jumper, metal nanowires in the touch electrode can be avoided from excessively gathering or settling near the jumper, and the low contact impedance and optical visibility requirements of the touch module can be met, thus improving the reliability of the touch device and further meeting product specifications.

Figure 1C:
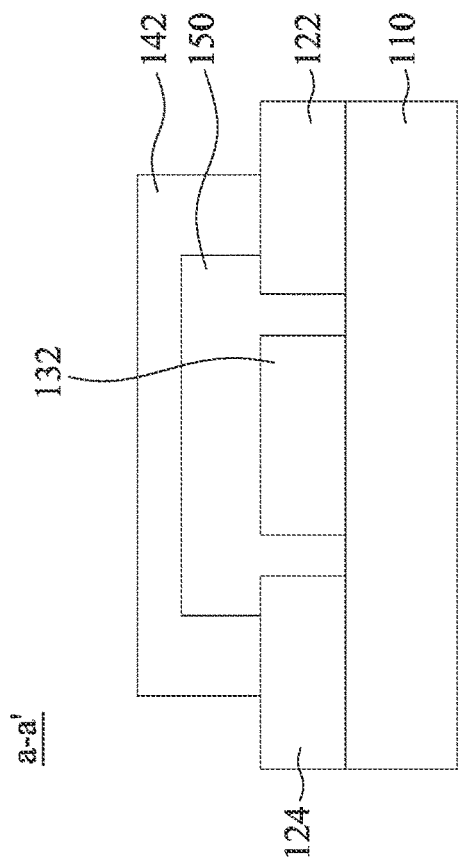
FIG. 1C is a schematic cross-sectional view of the touch module in FIG. 1A according to some other embodiments of the present disclosure, in which a section position is identical to a section position of the line segment a-a'.
Figure 1B:
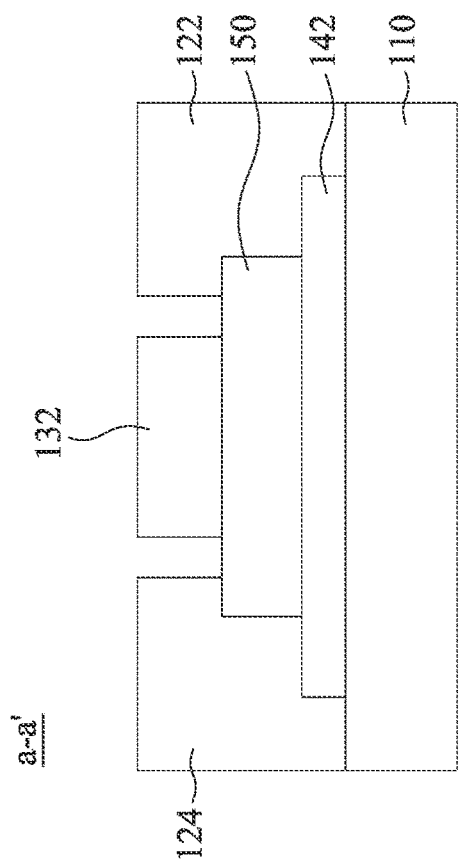
FIG. 1B is a schematic cross-sectional view of the touch module in FIG. 1A taken along a line segment a-a'.

FIG. 1A is a schematic top view of a touch module 100 according to some embodiments of the present disclosure, and FIG. 1B is a schematic cross-sectional view of the touch module 100 in FIG. 1A taken along a line segment a-a'. Referring to FIGS. 1A and 1B, the touch module 100 provided by the present disclosure is a single-sided bridge-type touch module 100, and the touch module 100 may include a substrate 110, a horizontal touch electrode layer 120, a vertical touch electrode layer 130, and a jumper layer 140. In some embodiments, the substrate 110 has a visible area VA and a peripheral area PA around the visible area VA, and the horizontal touch electrode layer 120, the vertical touch electrode layer 130, and the jumper layer 140 are disposed in the visible area VA of the substrate 110. In some embodiments, the substrate 110 may be, for example, a rigid transparent substrate or a flexible transparent substrate. Specifically, a material of the substrate 110 may include, but is not limited to, transparent materials such as polypropylene, polyvinyl chloride, polystyrene, polycarbonate, cyclic olefin polymer, cyclic olefin copolymer, polyethylene terephthalate, polyethylene naphthalate, glass, acrylic, colorless polyimide, or combinations thereof.

In some embodiments, the horizontal touch electrode layer 120 may include a plurality of horizontal touch electrodes which are disposed at intervals along a first direction D1. For example, the horizontal touch electrode layer 120 may include a first horizontal touch electrode 122, a second horizontal touch electrode 124, and a third horizontal touch electrode 126 which are disposed at intervals along the first direction D1. In some embodiments, the jumper layer 140 may include a plurality of jumpers, and each jumper is disposed between the adjacent horizontal touch electrodes in the first direction D1 so as to connect the adjacent horizontal touch electrodes. For example, the jumper layer 140 may include a first jumper 142 and a second jumper 144, in which the first jumper 142 is disposed between the first horizontal touch electrode 122 and the second horizontal touch electrode 124 so as to connect the first horizontal touch electrode 122 and the second horizontal touch electrode 124, and the second jumper 144 is disposed between the second horizontal touch electrode 124 and the third horizontal touch electrode 126 so as to connect the second horizontal touch electrode 124 and the third horizontal touch electrode 126. Based on the foregoing description, the jumpers connect the horizontal touch electrodes with each other to form an electronic transferring path extending along the first direction D1. In some embodiments, the vertical touch electrode layer 130 may include a plurality of vertical touch electrodes which are arranged at intervals along the first direction D1 and extend along a second direction D2. Each vertical touch electrode is disposed between the adjacent horizontal touch electrodes, and the first direction D1 is perpendicular to the second direction D2. For example, the vertical touch electrode layer 130 may include a first vertical touch electrode 132 and a second vertical touch electrode 134 which are arranged at intervals along the first direction D1 and extend along the second direction D2. The first vertical touch electrode 132 is disposed between the first horizontal touch electrode 122 and the second horizontal touch electrode 124, and the second vertical touch electrode 134 is disposed between the second horizontal touch electrode 124 and the third horizontal touch electrode 126. Based on the foregoing description, the vertical touch electrodes may form an electronic transferring path extending in the second direction D2. In some embodiments, the vertical touch electrode may straddle the jumper above the jumper along the second direction D2, and the vertical touch electrode is electrically insulated from the jumper by an insulating layer 150, such that the vertical touch electrode is electrically insulated from the horizontal touch electrode. In other words, by disposing the insulating layer 150 between the vertical touch electrode and the jumper, the vertical touch electrode and the horizontal touch electrode respectively realize the signal transmission in different directions.

In the embodiment of FIG. 1B, the first jumper 142 is located between the substrate 110 and the first horizontal touch electrode 122/the second horizontal touch electrode 124/the first vertical touch electrode 132, and two ends of the first jumper 142 are embedded in the adjacent first horizontal touch electrode 122 and second horizontal touch electrode 124 respectively. In other words, the two ends of the first jumper 142 are respectively sandwiched between the substrate 110 and the first horizontal touch electrode 122 and between the substrate 110 and the second horizontal touch electrode 124 in an extending direction perpendicular to the substrate 110 in a contact manner. Please refer to FIG. 1C, which is a schematic cross-sectional view of the touch module 100 in FIG. 1A according to some other embodiments of the present disclosure, in which a section position is identical to a section position of the line segment a-a'. In the embodiment of FIG. 1C, the first horizontal touch electrode 122, the second horizontal touch electrode 124, and the first vertical touch electrode 132 are disposed between the substrate 110 and the first jumper 142, and the first horizontal touch electrode 122, the second horizontal touch electrode 124, and the first vertical touch electrode 132 are located in a same horizontal plane. In other words, the first jumper 142 may straddle the first vertical touch electrode 132 above the first vertical touch electrode 132 along the first direction D1, and two ends of the first jumper 142 are respectively in contact with a surface of the first horizontal touch electrode 122 facing away from the substrate 110 and a surface of the second horizontal touch electrode 124 facing away from the substrate 110. Additionally, in the embodiment of FIG. 1C, a portion of the insulating layer 150 is embedded between the first horizontal touch electrode 122/the second horizontal touch electrode 124 and the first vertical touch electrode 132. Based on the structures illustrated in FIGS. 1B and 1C, in the touch module 100 of the present disclosure, the horizontal touch electrode, the vertical touch electrode, and the jumper may have at least two stacking manners, thus realizing the transmission of horizontal and vertical touch signals in multiple ways.

In some embodiments, each of the first horizontal touch electrode 122, the second horizontal touch electrode 124, and the first vertical touch electrode 132 may include a matrix and a plurality of metal nanowires distributed in the matrix. The matrix may include a polymer or a mixture thereof, thus endowing the horizontal touch electrode and the vertical touch electrode with specific chemical, mechanical, and optical properties. For example, the matrix can provide desired adhesion between the horizontal and vertical touch electrodes and other layers. As another example, the matrix can provide the horizontal and vertical touch electrodes with good mechanical strength. In some embodiments, the matrix may include a specific polymer, such that the horizontal and vertical touch electrodes have additional scratch/wear-resistant surface protection, thereby improving the surface strength of the horizontal and vertical touch electrodes. The foregoing specific polymer may be, for example, polyacrylate, epoxy resin, polyurethane, polysiloxane, polysilane, poly (silicon-acrylic acid), or combinations thereof. In some embodiments, the matrix may further include a cross-linking agent, an interface activator, a stabilizer (including, for example, but not limited to, an antioxidant or an ultraviolet (UV) stabilizer), a polymerization inhibitor, or combinations thereof, thus improving the anti-ultraviolet property of the horizontal and vertical touch electrodes and prolonging their service life.

In some embodiments, the metal nanowires may include, but are not limited to, silver nanowires, gold nanowire, copper nanowires, nickel nanowires, or a combination thereof. More specifically, the "metal nanowire" herein is a collective noun, which refers to a collection of metal wires of a plurality of metal elements, metal alloys, or metal compounds (including metal oxides). In addition, the number of metal nanowires included in the first horizontal touch electrode 122, the second horizontal touch electrode 124, and the first vertical touch electrode 132 is not intended to limit the present disclosure. Since the metal nanowires of the present disclosure have excellent light transmittance, when the touch module 100 is configured to serve as a touch display module, the metal nanowires can provide the first horizontal touch electrode 122, the second horizontal touch electrode 124, and the first vertical touch electrode 132 with good conductivity without affecting the optical properties of the touch display module.

As described above, in the touch module 100 of the present disclosure, the first horizontal touch electrode 122 and the second horizontal touch electrode 124 are connected to the first jumper 142. By the special design in the structure of the first jumper 142, the metal nanowires in the first horizontal touch electrode 122 and the second horizontal touch electrode 124 can be avoided from excessively gathering or settling near the first jumper 142 (especially, at the corner of the first jumper 142), so as to meet the product specifications. When the first jumper 142 includes a metal material (for example, copper or aluminum), and the chemical reactivity of the metal material is higher than the chemical reactivity of the metal nanowires (for example, silver nanowires) in the first horizontal touch electrode 122 and the second horizontal touch electrode 124, metal ions (for example, silver ions) that have reached chemical equilibrium in the first horizontal touch electrode 122 and the second horizontal touch electrode 124 are easily reduced by the metal material of the first jumper 142, such that the metal nanowires excessively gather or settle near the first jumper 142. By designing at least one edge (for example, at least one corner) of a portion (for example, the two ends of the first jumper 142) where the first jumper 142 is in contact with the first horizontal touch electrode 122 and the second horizontal touch electrode 124 to have a non-angular shape such as a chamfer, an inverted arc, a circular arc, a wave, or combinations thereof, the metal ions in the first horizontal touch electrode 122 and the second horizontal touch electrode 124 can be avoided from being over-reduced near the first jumper 142, thus avoiding the metal nanowires from excessively gathering or settling near the first jumper 142 and further avoiding problems such as a short circuit, open circuit, and dirty etching.

Figure 2A:
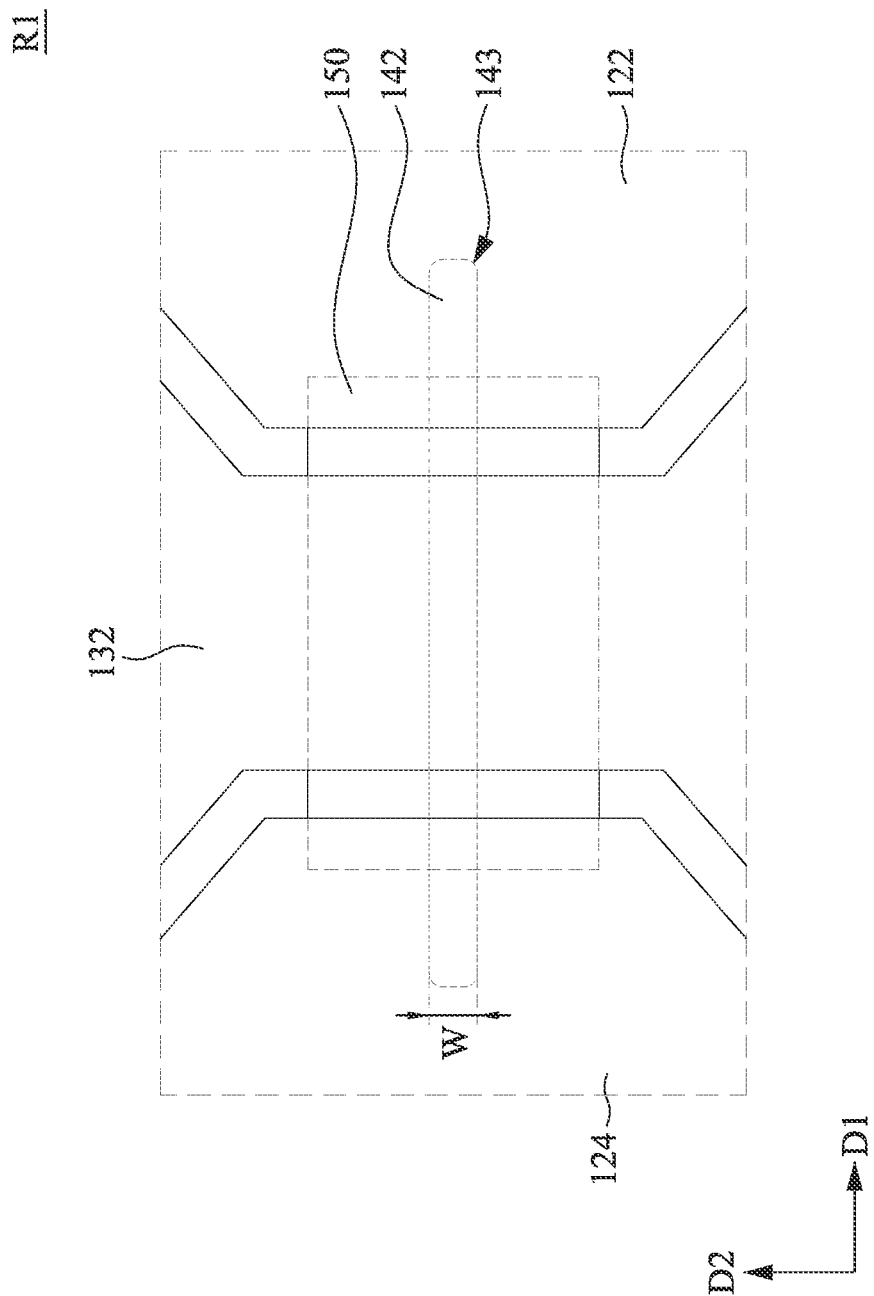
FIGS. 2A to 2C are partially enlarged perspective views of a region R1 of the touch module in FIG. 1A according to different embodiments of the present disclosure.
Figure 2B:
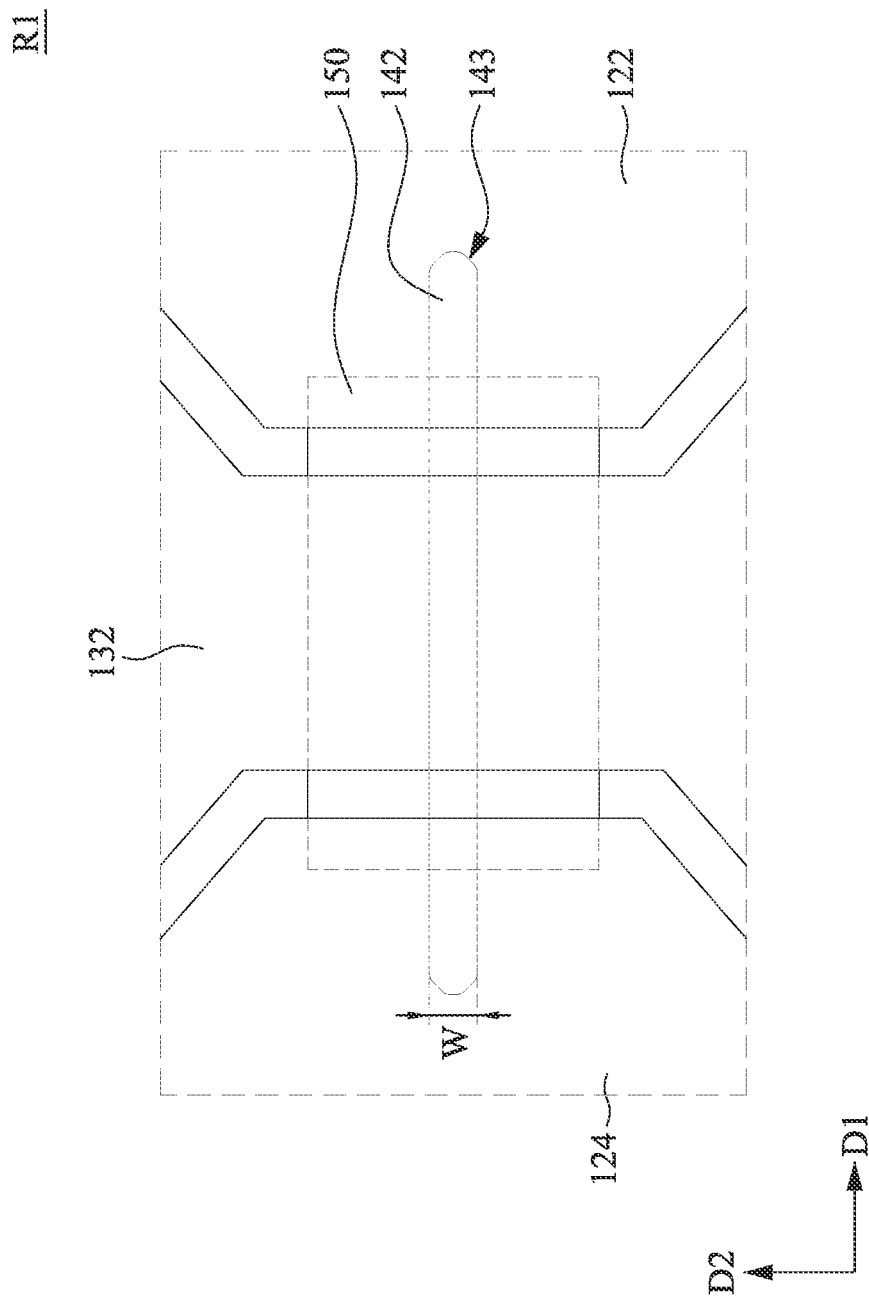
Figure 2C:
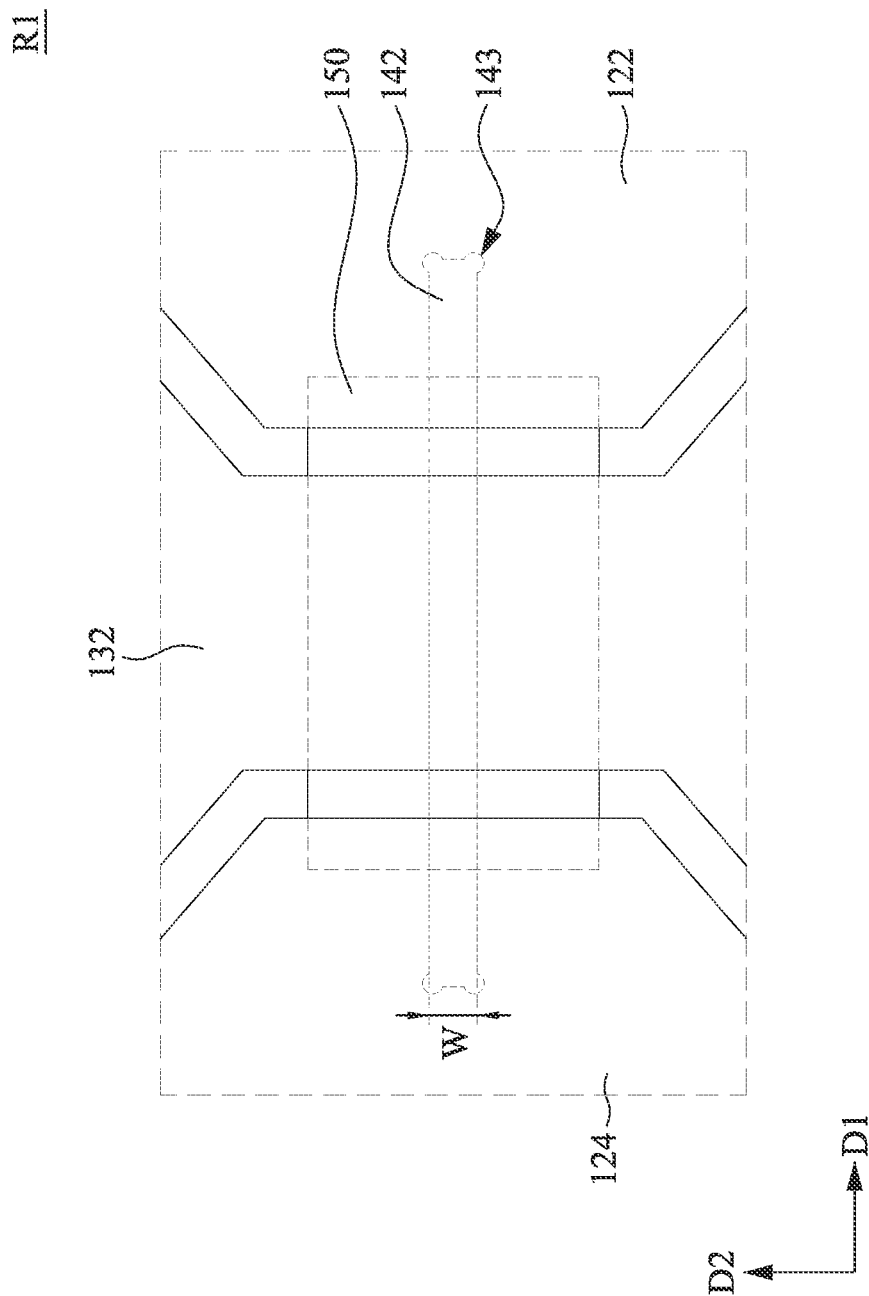

Specifically, please refer to FIGS. 2A to 2C, which are partially enlarged perspective views of a region R1 of the touch module 100 in FIG. 1A according to different embodiments of the present disclosure. In detail, in the embodiments of FIGS. 2A to 2C, at least one edge 143 of the first jumper 142 (for example, edges 143 at the two ends of the first jumper 142) is sequentially designed to have a shape of a chamfer, an inverted arc, or a circular arc, so as to solve the problem of excessive gathering or settlement of the metal nanowires. It should be noted that, whether to design all the edges 143 (for example, multiple corners) of the first jumper 142 to have a shape of a chamfer, an inverted arc, a circular arc, a wave, or combinations thereof depends on a difference in chemical reactivity between the materials of the first jumper 142 and the metal nanowires. More specifically, when there is a great difference in chemical reactivity between the materials of the first jumper 142 and the metal nanowires, all edges 143 that can be angular in the first jumper 142 are designed to have a shape such as a chamfer, an inverted arc, a circular arc, a wave, or combinations thereof, so as to better solve the problem of excessive gathering or settlement of the metal nanowires. In some embodiments, the first jumper 142 has a width (line width) W (for example, a width W in the second direction D2) that may range from 5 μm to 30 μm. When the material of the first jumper 142 is metal, the width W of the first jumper 142 may preferably range from 5 μm to 10 μm. When the material of the first jumper 142 is a metal oxide (for example, indium tin oxide), the width W of the first jumper 142 may preferably range from 10 μm to 30 μm. In this way, the portions where the first jumper 142 overlaps the first horizontal touch electrode 122, the second horizontal touch electrode 124, and the first vertical touch electrode 132 can be ensured to maintain an invisible state, and the first jumper 142 can be stably electrically connected to the adjacent first horizontal touch electrode 122 and second horizontal touch electrode 124.

In addition to the special shape design for the edge 143 of the first jumper 142, an oxide layer may be formed on a surface of the first jumper 142 (for example, a surface of the first jumper 142 that contacts the first horizontal touch electrode 122 and a surface of the first jumper 142 that contacts the second horizontal touch electrode 124), so as to prevent the first jumper 142 from over-reducing metal ions in the first horizontal touch electrode 122 and the second horizontal touch electrode 124 due to the excessively high surface electron activity of the first jumper 142, thus avoiding the metal nanowires from excessively gathering or settling near the first jumper 142. Specifically, please refer to FIG. 3A, which a schematic cross-sectional view of the touch module 100 in FIG. 1A according to some embodiments of the present disclosure, in which a section position is identical to the section position of the line segment a-a'. In the embodiment of FIG. 3A, the touch module 100 further includes an oxide layer 160, in which the oxide layer 160 covers a sidewall 145 of the first jumper 142 and a surface 141 of the first jumper 142 that faces away from the substrate 110, so as to directly contact the first horizontal touch electrode 122 and the second horizontal touch electrode 124. In other words, the oxide layer 160 is between the first jumper 142 and the first horizontal touch electrode 122 and between the first jumper 142 and the second horizontal touch electrode 124, so as to appropriately separate the first jumper 142 and the metal nanowires in the first horizontal touch electrode 122 and the second horizontal touch electrode 124. Additionally, the oxide layer 160 also directly contacts the insulating layer 150 and separates the first jumper 142 and the insulating layer 150 from each other.

In some embodiments, the oxide layer 160 may, for example, conformally cover the entire sidewall 145 and the entire surface 141 of the first jumper 142, so as to better solve the problem of excessive gathering or settlement of the metal nanowires. It should be noted that, "conformally covering" herein means "covering with a uniform and consistent thickness". In some embodiments, a thickness H1 of the oxide layer 160 may range from 5 nm to 20 nm, such that the oxide layer 160 can moderately block the surface electrons of the first jumper 142 to prevent the electrons from over-reducing the metal ions, and that the first jumper 142 can still be electrically connected to the first horizontal touch electrode 122 and the second horizontal touch electrode 124. In detail, if the thickness H1 of the oxide layer 160 is less than 5 nm, the surface electrons of the first jumper 142 may still excessively pass though the oxide layer 160 to cause over-reduction of the metal nanowires in the first horizontal touch electrode 122 and the second horizontal touch electrode 124; if the thickness H1 of the oxide layer 160 is greater than 20 nm, the electrical connection between the first jumper 142 and the first horizontal touch electrode 122 and the electrical connection between the first jumper 142 and the second horizontal touch electrode 124 may fail, thus disrupting the electrical function of the touch module 100.

In some embodiments, the oxide layer 160 may be formed, for example, by a baking process, an electroplating process, or exposure to a high-oxygen-concentration environment. In the baking process, a high temperature is applied to the surface of the first jumper 142 to oxidize the metal material on the surface of the first jumper 142, so as to form a thin oxide layer 160. That is, the oxide layer 160 formed by the baking process is a metal oxide layer, and metal atoms in the metal oxide layer are derived from metal atoms on the surface of the first jumper 142. In some embodiments, a temperature of the baking process may range from 200° C. to 250° C., and a baking time may range from 20 min to 40 min, so as to well control the thickness H1 of the oxide layer 160. In the electroplating process, a metal oxide is externally added onto the surface of the first jumper 142, so as to form the oxide layer 160. In some embodiments, a power of the electroplating process may range from 2 kW to 15 kW, so as to well control the thickness H1 of the oxide layer 160. A thin oxide layer 160 may also be formed on the surface of the first jumper 142 by exposing the first jumper 142 to a high-oxygen-concentration environment, and the oxide layer 160 formed in this way is also a metal oxide layer formed by oxidization of the metal material on the surface of the first jumper 142. In some embodiments, an exposure time may range from 10 to 120 seconds, and an oxygen flux may range from 20 sccm to 50 sccm, so as to well control the thickness H1 of the oxide layer 160.

Next, please refer to FIG. 3B, which is a schematic cross-sectional view of the touch module 100 in FIG. 1A according to some other embodiments of the present disclosure, in which a section position is identical to the section position of the line segment a-a'. In the embodiment of FIG. 3B, the first jumper 142 of the touch module 100 is formed by sequentially stacking three conductive layers 142a, 142b, and 142c, in which each of the three conductive layers 142a, 142b, and 142c may include a different metal material (for example, the conductive layer 142a includes molybdenum, the conductive layer 142b includes aluminum, and the conductive layer 142c includes molybdenum). The oxide layer 160 covers the entire surface 141 of the first jumper 142 that faces away from the substrate 110 (i.e., an upper surface of the conductive layer 142c) and sidewalls 145 of the first jumper 142 (i.e., respective sidewalls of the conductive layers 142a, 142b, and 142c). In some embodiments, the oxide layer 160 may have a plurality of portions, and an oxide material of each portion is corresponding to a material of a conductive layer which the portion covers. For example, a portion 160a of the oxide layer 160 covering the conductive layer 142a may include molybdenum oxide ($MoO_3$), a portion 160b of the oxide layer 160 covering the conductive layer 142b may include aluminum oxide ($Al_2O_3$), and a portion 160c of the oxide layer 160 covering the conductive layer 142c may include molybdenum oxide ($MoO_3$). Because each of the portions 160a, 160b, and 160c of the oxide layer 160 may include a different oxide material, interfaces can be observed between the portions 160a, 160b, and 160c of the oxide layer 160 at a microscopic scale, and the portions 160a, 160b, and 160c of the oxide layer 160 may have different material density (for example, the density of aluminum oxide>the density of molybdenum oxide>the density of copper oxide). It should be noted that, the metal materials included in the first jumper 142 are not intended to limit the present disclosure. In some other embodiments, the first jumper 142 may also include metallic silver or other alloy materials.

Figure 4:
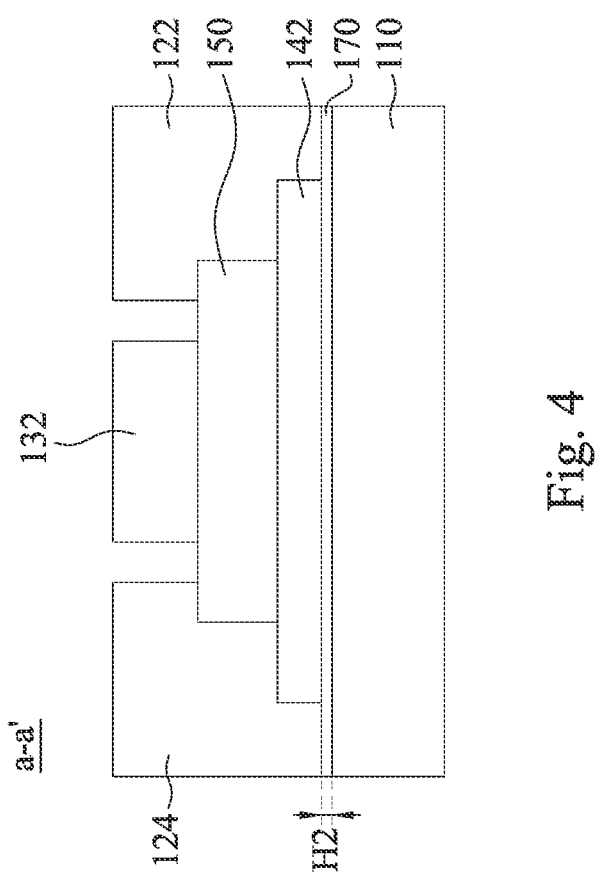
FIG. 4 is a schematic cross-sectional view of the touch module in FIG. 1A according to some embodiments of the present disclosure, in which a section position is identical to the section position of the line segment a-a'.

Please refer to FIG. 4, which is a schematic cross-sectional view of the touch module 100 in FIG. 1A according to some embodiments of the present disclosure, in which a section position is identical to the section position of the line segment a-a'. In the embodiment of FIG. 4, a material of the substrate 110 may include alkaline glass, such as soda glass, potassium glass, lime glass, or combinations thereof. When the substrate 110 is made of the foregoing material, the touch module 100 may further include an isolation layer 170 disposed between the substrate 110 and the first horizontal touch electrode 122 and the second horizontal touch electrode 124. The isolation layer 170 can prevent the foregoing material from reducing metal ions (for example, silver ions) that have reached chemical equilibrium in the first horizontal touch electrode 122 and the second horizontal touch electrode 124 to avoid crystallization near an etching line S (referring to FIG. 1A), so as to prevent the metal nanowires from causing a short or open circuit in the touch module 100 due to low reliability. In some embodiments, the isolation layer 170 may be an inorganic material which includes, but is not limited to, silicon oxide (for example $SiO_2$), a nitrogen-silicon compound ($SiN_x$), or combinations thereof, or the isolation layer 170 may be a non-conductive resin or other organic materials. The non-conductive resin or other organic materials may be, for example, but are not limited to polyacrylate, epoxy resin, polyurethane, polysiloxane, poly(silicon-acrylic), polyethylene, polypropylene, polyvinyl butyral, polycarbonate, acrylonitrile-butadiene-styrene copolymer, poly(3,4-ethylenedioxythiophene), poly(styrene sulfonic acid), ceramic materials, or combinations thereof. In some embodiments, the isolation layer 170 has a thickness H2 ranging from 20 nm to 1.5 µm, so as to effectively achieve an electrical isolation function, thus improving the reliability of the metal nanowires. More specifically, when the isolation layer 170 is made of the inorganic material, the thickness H2 of the isolation layer 170 may preferably range from 20 nm to 60 nm; when the isolation layer 170 is made of the non-conductive resin or other organic materials, the thickness H2 of the isolation layer 170 may preferably range from 0.5 µm to 1.5 µm. In some embodiments, the isolation layer 170 may also be formed, for example, by alternately stacking an inorganic material layer and an organic material layer.

The etching line S is defined as an area lacking conductive material and is formed by removing the conductive material in the area (for example, ITO, metal nanowires, metal nanowires distributed in the matrix, or the composite conductive material of metal nanowires and the matrix) to form a pattern of the touch electrode, such as the pattern shape of the first horizontal touch electrode 122 and the second horizontal touch electrode 124 of the present disclosure. In the case where it is necessary to provide a dummy pattern, the etching line S is also formed by removing the conductive material to form the dummy pattern. Therefore, the etching line S can be used to separate a first touch electrode from a second touch electrode, can be used to separate a first touch electrode from a dummy electrode, and can also be used to separate a first dummy electrode from a second dummy electrode. The method of removing the conductive material can be performed by etching with an etching solution or by the energy of a laser.

As described above, in the touch module 100 of the present disclosure, the first horizontal touch electrode 122 and the second horizontal touch electrode 124 are connected to the first jumper 142, and by the special design in the structure of the first jumper 142, the touch module 100 can meet both the low contact impedance requirement and the optical visibility requirement, thus improving the reliability of the touch device and further meeting product specifications. Specifically, please refer to FIGS. 5A and 5B, in which FIG. 5A is a partially enlarged perspective view of the region R1 of the touch module 100 in FIG. 1A according to some embodiments of the present disclosure, and FIG. 5B is a schematic cross-sectional view of the touch module 100 in FIG. 5A taken along a line segment b-b'.

Figure 5A:
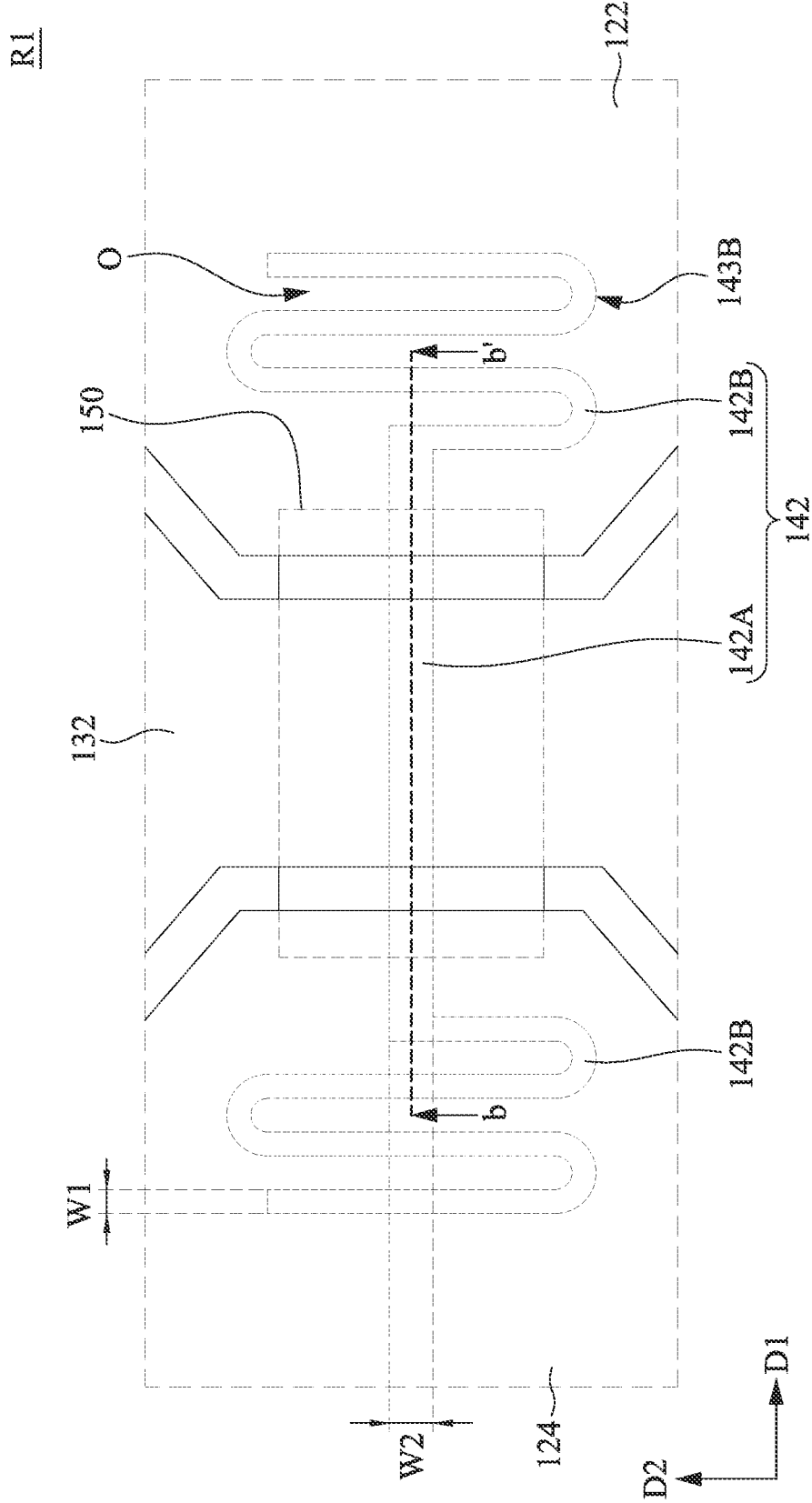
FIG. 5A is a partially enlarged perspective view of the region R1 of the touch module in FIG. 1A according to some embodiments of the present disclosure.
Figure 5E:
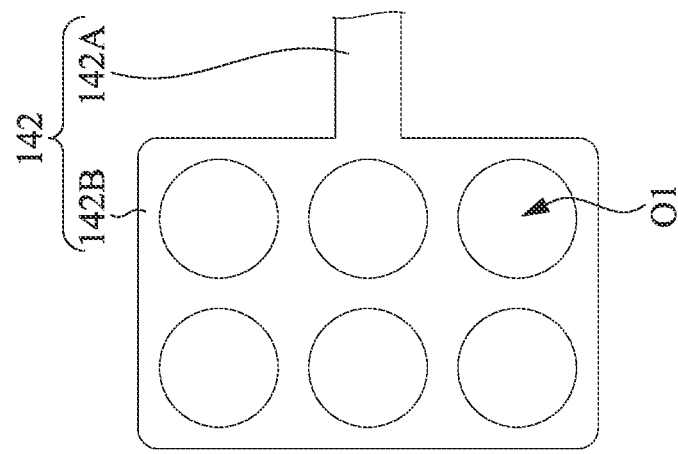
FIGS. 5D to 5G are schematic top views of a first extending portion of a first jumper in FIG. 5A according to different embodiments of the present disclosure.
Figure 5D:
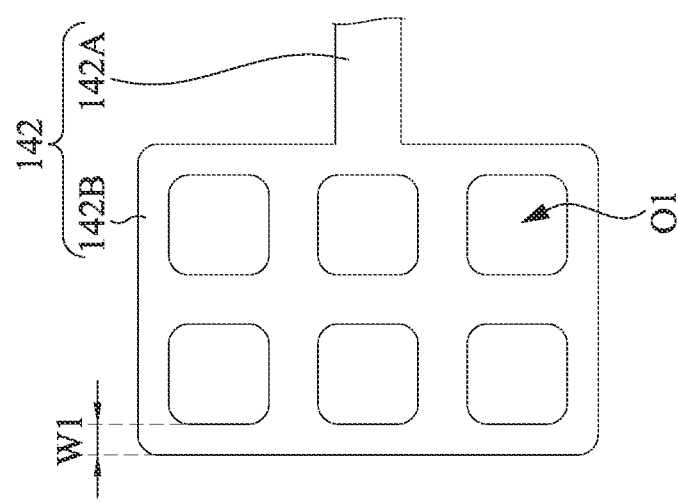
Figure 5F:
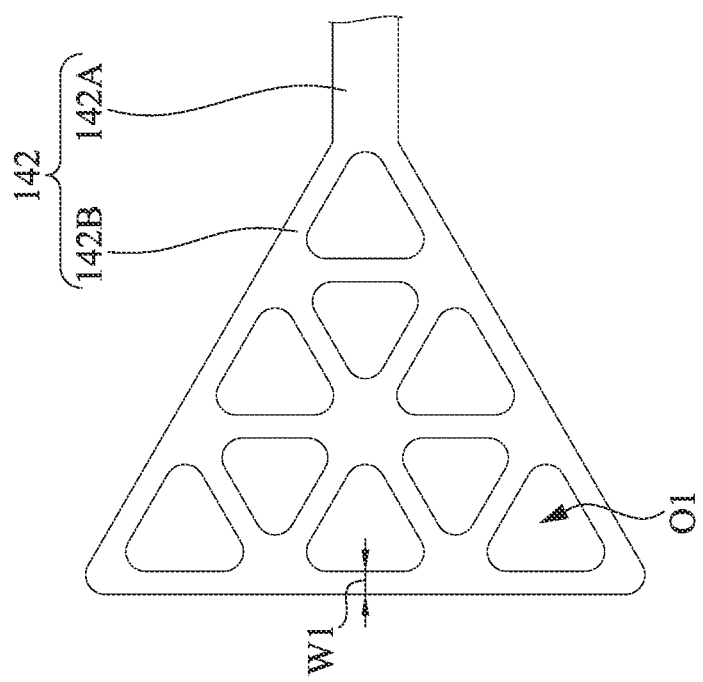

In the embodiments of FIGS. 5A and 5B, the first jumper 142 of the touch module 100 is connected to the first horizontal touch electrode 122 and the second horizontal touch electrode 124, and the first jumper 142 has a first main portion 142A and at least two first extending portions 142B. The first main portion 142A is located between the two first extending portions 142B in the first direction D1, and the first main portion 142A is partially embedded in the first horizontal touch electrode 122 and the second horizontal touch electrode 124. The two first extending portions 142B are respectively connected at the two ends of the first main portion 142A, and the two first extending portions 142B are entirely covered by the adjacent first horizontal touch electrode 122 and second horizontal touch electrode 124, respectively. That is, the two first extending portions 142B are respectively disposed corresponding to the adjacent first horizontal touch electrode 122 and second horizontal touch electrode 124. In some embodiments, the two first extending portions 142B are respectively sandwiched between the substrate 110 and the first horizontal touch electrode 122 and between the substrate 110 and the second horizontal touch electrode 124 in a contact manner. In some embodiments, the two first extending portions 142B may each form at least one opening O, and at least a portion of each of the first horizontal touch electrode 122 and the second horizontal touch electrode 124 extends into the opening O. That is, each of the first horizontal touch electrode 122 and the second horizontal touch electrode 124 has at least a portion which extends to a sidewall 142S of the corresponding first extending portion 142B and may further contact the substrate 110. By the arrangement of the first extending portions 142B, contact areas between the first horizontal touch electrode 122 and the first jumper 142 and between the second horizontal touch electrode 124 and the first jumper 142 are increased, so as to guarantee low contact impedance between the first jumper 142 and each of the first horizontal touch electrode 122 and the second horizontal touch electrode 124, thus meeting the low contact impedance requirement of the touch module 100. By the design of the opening O, the portions of the first jumper 142 respectively overlapping the first horizontal touch electrode 122 and the second horizontal touch electrode 124 can be invisible to the user (i.e., the overlapping portions maintain an invisible state), so as to meet the optical visibility requirement of the touch module 100. In the embodiment of FIG. 5A, each of the two first extending portions 142B of the first jumper 142 has an irregular wave shape, and each of the wave-shaped first extending portions 142B forms a plurality of openings O. In some other embodiments, each of the first extending portions 142B of the first jumper 142 may have a dumbbell-like shape or an irregular branch-like shape, and each of the dumbbell-like or branch-like shaped first extending portions 142B may also form a plurality of openings O.

In some embodiments, each of the first extending portions 142B of the first jumper 142 may have a width W1 (for example, a line width) ranging from 5 µm to 30 µm, so as to reduce the contact impedance between the first jumper 142 and each of the first horizontal touch electrode 122 and the second horizontal touch electrode 124 and to further ensure that the portions of the first jumper 142 respectively overlapping the first horizontal touch electrode 122 and the second horizontal touch electrode 124 are invisible to the user, thus meeting both the low contact impedance requirement and the optical visibility requirement of the touch module 100. In detail, if the width W1 of each of the first extending portions 142B is less than 5 µm, the contact area between the first jumper 142 and the first horizontal touch electrode 122/the second horizontal touch electrode 124 may be excessively small, such that the contact impedance cannot be effectively reduced; if the width W1 of each of the first extending portions 142B is greater than 30 µm, the overlapping area between the first jumper 142 and the first horizontal touch electrode 122/the second horizontal touch electrode 124 may be excessively large, such that the overlapping portion between the first jumper 142 and the first horizontal touch electrode 122/the second horizontal touch electrode 124 is visually obvious. In some embodiments, when the material of the first jumper 142 is metal, the width W1 of each of the first extending portions 142B may preferably range from 5 µm to 10 µm; when the material of the first jumper 142 is a metal oxide (for example, indium tin oxide), the width W1 of each of the first extending portions 142B may preferably range from 10 µm to 30 µm. Additionally, the first main portion 142A of the first jumper 142 has a width W2 (a line width) which may also range from 5 µm to 30 µm, such that the portion of the first main portion 142A overlapping the first horizontal touch electrode 122/the vertical touch electrode 132/the second horizontal touch electrode 124 is invisible to the user, and the first main portion 142A can be stably electrically connected to the adjacent first horizontal touch electrode 122 and second horizontal touch electrode 124. In some embodiments, the width W1 of each of the first extending portions 142B may be equal to the width W2 of the first main portion 142A, thus improving the convenience of the manufacturing process.

In some embodiments, the contact area between the first horizontal touch electrode 122/the second horizontal touch electrode 124 and the corresponding first extending portion 142B may range from 0.01 mm² to 0.3 mm², so as to meet both the electrical requirement and the optical visibility requirement of the touch module 100. In detail, if the contact area is less than 0.01 mm², the contact impedance between the first jumper 142 and the first horizontal touch electrode 122/the second horizontal touch electrode 124 cannot be effectively reduced, thus failing to meet the electrical requirement of the touch module 100; if the contact area is greater than 0.3 mm², the portion of the first jumper 142 overlapping the first horizontal touch electrode 122/the second horizontal touch electrode 124 cannot maintain an invisible state. In some embodiments, when the material of the first jumper 142 is metal, the contact area between the first horizontal touch electrode 122/the second horizontal touch electrode 124 and the corresponding first extending portion 142B may preferably range from 0.01 mm² to 0.3 mm²; when the material of the first jumper 142 is a metal oxide (for example, indium tin oxide), the contact area between the first horizontal touch electrode 122/the second horizontal touch electrode 124 and the corresponding first extending portion 142B may preferably range from 0.01 mm² to 0.03 mm².

In the embodiment of FIG. 5A, at least one edge 143B (for example, at least one corner or turning point) of the first extending portion 142B of the first jumper 142 may also have a shape such as a chamfer, an inverted arc, a circular arc, a wave, or combinations thereof, so as to solve the problem of excessive gathering or settlement of the metal nanowires. In the embodiment of FIG. 5A, the touch module 100 may also include the oxide layer 160 (referring to FIG. 3A) covering at least one surface of the first jumper 142, so as to appropriately separate the first jumper 142 and the metal nanowires in the first horizontal touch electrode 122 and the second horizontal touch electrode 124. In the embodiment of FIG. 5A, when the material of the substrate 110 includes alkali glass, the touch module 100 may also include the isolation layer 170 (referring to FIG. 3C) located between the substrate 110 and the first horizontal touch electrode 122 and between the substrate 110 and the second horizontal touch electrode 124, so as to prevent the metal nanowires from causing a short or open circuit in the touch device due to low reliability. Reference is made to the foregoing description for the detailed arrangement, so the details are not repeated hereinafter.

Next, please refer to FIG. 5C, which is a schematic cross-sectional view of the touch module 100 in FIG. 5A according to some other embodiments of the present disclosure, in which a section position is identical to a section position of the line segment b-b'. At least one difference between the touch modules 100 in FIG. 5C and FIG. 5B lies in that: in the touch module 100 in FIG. 5C, the first horizontal touch electrode 122, the second horizontal touch electrode 124, and the first vertical touch electrode 132 are located between the substrate 110 and the first jumper 142, and the first horizontal touch electrode 122 and the second horizontal touch electrode 124 are partially exposed from the openings O formed by the first extending portions 142B of the first jumper 142. In other words, in the embodiment of FIG. 5C, the two first extending portions 142B of the first jumper 142 are respectively located on the surface of the first horizontal touch electrode 122 facing away from the substrate 110 and the surface of the second horizontal touch electrode 124 facing away from the substrate 110. It should be noted that, reference may be made to the description regarding FIGS. 1C and 5B for the arrangement of other elements and layers, so the details are not repeated hereinafter.

Figure 5G:
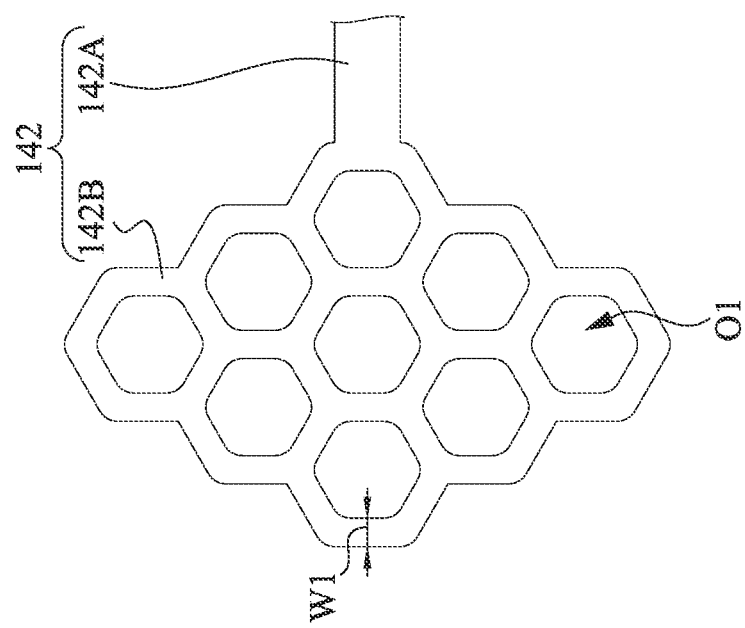

FIGS. 5D to 5G are schematic top views of one of the first extending portions 142B of the first jumper 142 in FIG. 5A according to different embodiments of the present disclosure. It should be noted that, the first jumper 142 in FIGS. 5D to 5G can be disposed in the touch module 100 in FIG. 5B or FIG. 5C. Specifically, in FIGS. 5D to 5G, the first extending portion 142B of the first jumper 142 forms openings O having different top-view outlines (i.e., outlines viewed from the angle of FIGS. 5D to 5G), and the openings O are closed through holes O1. The top-view outlines of the closed through holes O1 in the embodiments of FIGS. 5D to 5G are respectively rectangles, circles, triangles, and hexagons. However, the present disclosure is not limited thereto. In other embodiments, the top-view outlines of the closed through holes O1 may also be ovals, other polygons, or combinations of any foregoing shapes. In some embodiments, a plurality of the closed through holes O1 may be arranged, for example, in an array. In the embodiment of FIG. 5G, the closed through holes O1 may be arranged in a honeycomb pattern. In the embodiments of FIGS. 5A, 5D, 5F, and 5G, the line widths W1 of the first extending portion 142B of the first jumper 142 may be uniform and consistent. It should be noted that, reference may be made to the foregoing description for other details of the first jumper 142 (for example, the line widths W1 and W2 and the contact area between the first jumper 142 and the first horizontal touch electrode 122/the second horizontal touch electrode 124), so the details are not repeated hereinafter.

Figure 6A:
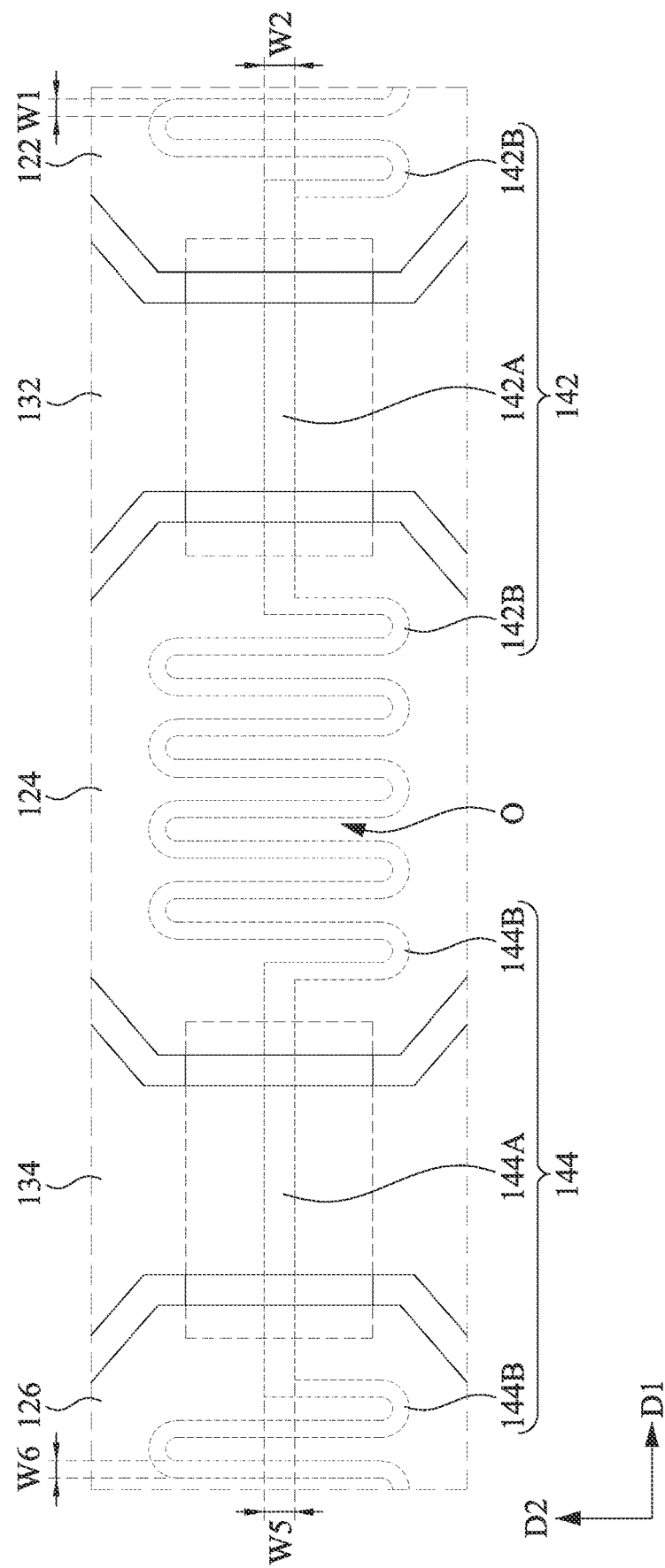
FIG. 6A is a partially enlarged perspective view of a region R2 of the touch module in FIG. 1A according to some embodiments of the present disclosure.

FIG. 6A is a partially enlarged perspective view of a region R2 of the touch module 100 in FIG. 1A according to some embodiments of the present disclosure, which further shows a relationship between the third horizontal touch electrode 126, the second jumper 144, and the second vertical touch electrode 134. Specifically, the second jumper 144 is connected to the second horizontal touch electrode 124 and the third horizontal touch electrode 126, and the second jumper 144 has a second main portion 144A and at least two second extending portions 144B connected to the second main portion 144A. The second main portion 144A is located between the two second extending portions 144B in the first direction D1, and the two second extending portions 144B are respectively disposed corresponding to the second horizontal touch electrode 124 and the third horizontal touch electrode 126. In other words, one of the second extending portions 144B of the second jumper 144 and one of the first extending portions 142B of the first jumper 142 are disposed corresponding to the second horizontal touch electrode 124. Additionally, the second vertical touch electrode 134 is located between the second horizontal touch electrode 124 and the third horizontal touch electrode 126 in the first direction D1, and the second vertical touch electrode 134 is electrically insulated from the second jumper 144. In the embodiment of FIG. 6A, the first extending portion 142B and the second extending portion 144B that are both corresponding to the second horizontal touch electrode 124 are mutually connected, such that the jumper layer 140 (referring to FIG. 1A) including the first jumper 142 and the second jumper 144 extends uninterruptedly in the first direction D1 and sequentially passes through the first horizontal touch electrode 122, the first vertical touch electrode 132, the second horizontal touch electrode 124, the second vertical touch electrode 134, and the third horizontal touch electrode 126. In this way, the contact impedance between the jumper layer 140 (referring to FIG. 1A) and the horizontal touch electrode layer 120 (referring to FIG. 1A) can be more stable, so as to meet the electrical requirement of the touch module 100. It should be noted that, in the foregoing embodiment of FIG. 5A, the first extending portion 142B and the second extending portion 144B (not shown in FIG. 5A) that are both corresponding to the second horizontal touch electrode 124 are disconnected. That is, in such an embodiment, the jumper layer 140 (referring to FIG. 1A) including the first jumper 142 and the second jumper 144 (not shown in FIG. 5A) extends intermittently in the first direction D1 and sequentially passes through the first horizontal touch electrode 122, the first vertical touch electrode 132, the second horizontal touch electrode 124, the second vertical touch electrode 134 (not shown in FIG. 5A), and the third horizontal touch electrode 126 (not shown in FIG. 5A).

In the embodiment of FIG. 6A, the materials of the first jumper 142 and the second jumper 144 may include, for example, silver, copper, or an alloy thereof. In this embodiment, the width W2 of the first main portion 142A of the first jumper 142, the width W1 of each of the first extending portions 142B of the first jumper 142, the width W5 of the second main portion 144A of the second jumper 144, and the width W6 of each of the second extending portions 144B of the second jumper 144 may all range from 3 μm to 5 μm, such that the portions of the jumper layer 140 overlapping the horizontal touch electrode layer 120 maintain an invisible state. Additionally, in the entire touch module 100, a distance (a line distance) between adjacent first main portions 142A of first jumpers 142 in the second direction D2 and a distance between adjacent second main portions 144A of second jumpers 144 in the second direction D2 may range from 0.5 mm to 5 mm, so as to avoid the occurrence of interference fringes caused by Moire effect, thus reducing the probability of optical interference. In some embodiments, each of the second extending portions 144B of the second jumper 144 may also form at least one opening O. As shown in FIG. 6A, each of the second extending portions 144B of the second jumper 144 may have an irregular wave shape, and each of the wave-shaped second extending portions 144B forms a plurality of openings O. The shape of each of the second extending portions 144B may be identical to the shape of each of the first extending portions 142B.

Figure 6B:
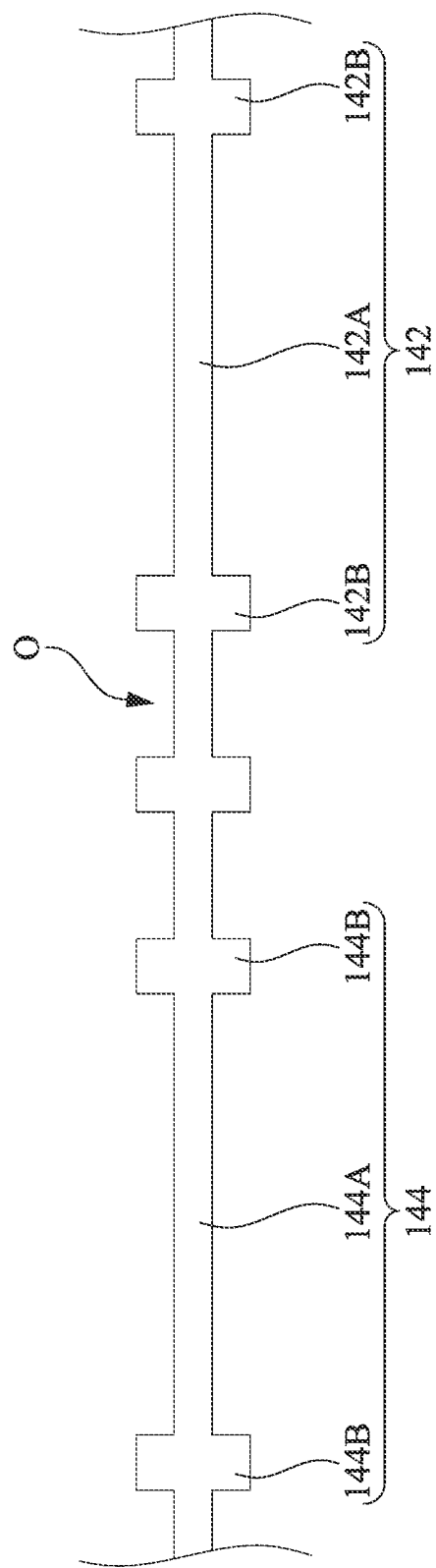
FIGS. 6B to 6D are schematic top views of a first jumper and a second jumper in FIG. 6A according to different embodiments of the present disclosure.
Figure 6C:
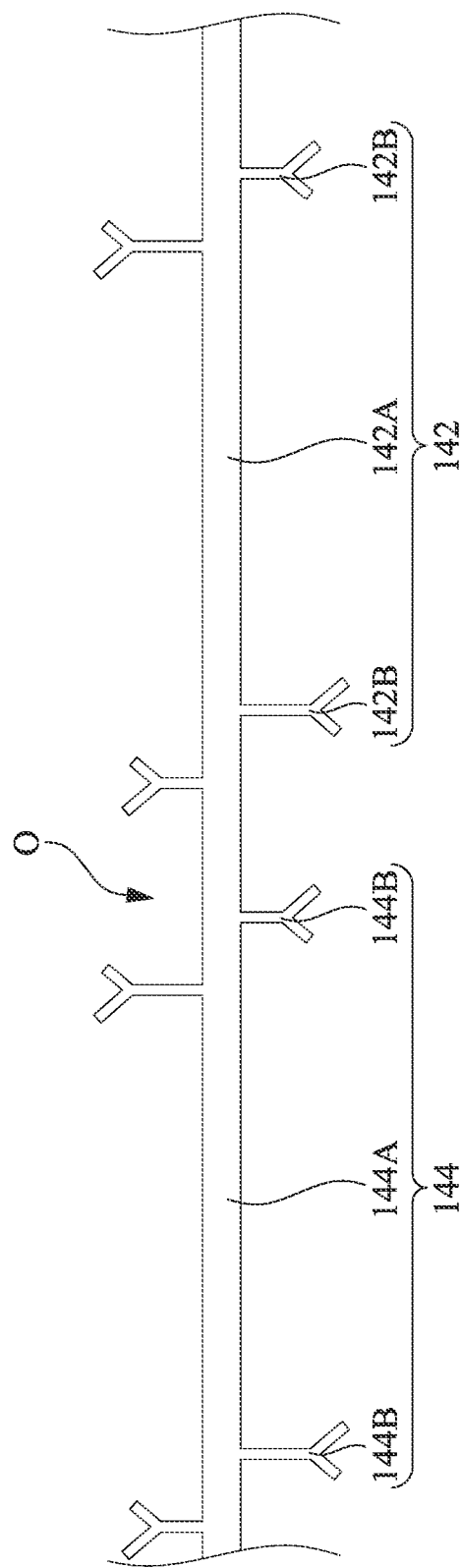
Figure 6D:
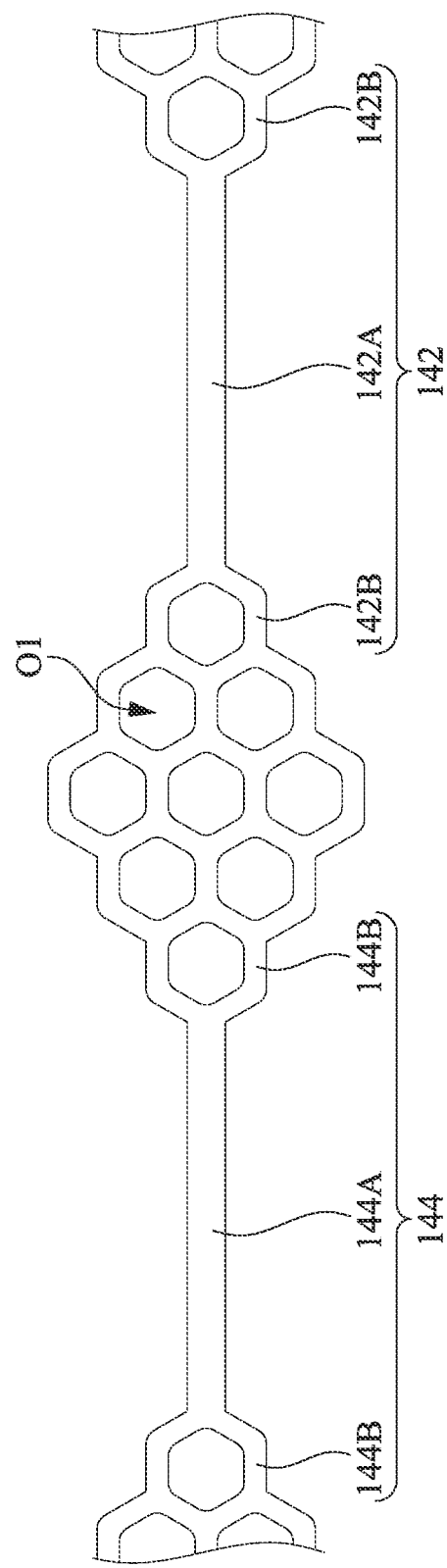

FIGS. 6B to 6D are schematic top views of the first jumper 142 and the second jumper 144 in FIG. 6A according to different embodiments of the present disclosure. Specifically, in the embodiment of FIG. 6B, each of the first extending portions 142B of the first jumper 142 and the second extending portions 144B of the second jumper 144 has a dumbbell-like shape. In the embodiment of FIG. 6C, each of the first extending portions 142B of the first jumper 142 and the second extending portions 144B of the second jumper 144 has an irregular branch-like shape. In the embodiment of FIG. 6D, each of the first extending portions 142B of the first jumper 142 and the second extending portions 144B of the second jumper 144 forms closed through holes O1 having a hexagon top-view outline (i.e., outline viewed from the angle of FIG. 6D), but the present disclosure is not limited thereto. In some other embodiments, the top-view outlines of the closed through holes O1 may also be rectangles, circles, triangles, ovals, other polygons, or combinations thereof. Reference may be made to relevant description in FIGS. 5A to 5G for shapes of the first extending portions 142B of the first jumper 142 and the second extending portions 144B of the second jumper 144, so the details are not repeated hereinafter.

Table 1 specifically verifies the influence of the line widths of the first jumper 142 and the second jumper 144 and a contact area between one of the first extending portions 142B of the first jumper 142 and the corresponding one horizontal touch electrode (or a contact area between one of the second extending portions 144B of the second jumper 144 and the corresponding one horizontal touch electrode) on the electrical performance of the whole touch module 100 by different comparative examples and embodiments. Referring to Table 1, the electrical test method used in the verification is to measure two sets of contact impedance, which are touch electrode impedance and jumper impedance, by means of line resistance. Since the electrode impedance is a fixed value far less than the contact impedance, the change in resistance can be considered as the contribution of different contact impedances. Electrical test results are shown in Table 1, in which "passing" means that the measured contact impedance ranges from 100 to 1200, and "not passing" means that the measured contact impedance falls beyond the foregoing range.

TABLE 1

| | First and second extending portions | | | Shapes of the first and second extending | |
|---|---|---|---|---|---|
| | Whether they are connected | Respective line widths (μm) | Contact areas (mm²) | portions/ closed through holes | Electrical test results |
| Comparative example 1 | No | 10 for both | 0.00635 | Shapes of the extending portions: branches | Not passing |
| Comparative example 2 | No | 10 for both | 0.003 | Shapes of the extending portions: straight line | Not passing |
| Embodiment 1 | No | 30 for both | 0.274 | Shapes of the extending portions: dumbbell | Passing |
| Embodiment 2 | No | 30 for both | 0.154 | Shapes of the extending portions: dumbbell | Passing |
| Embodiment 3 | No | 30 for both | 0.017 | Shapes of the extending portions: branches | Passing |
| Embodiment 4 | No | 30 for both | 0.015 | Shapes of the extending portions: branches | Passing |
| Embodiment 5 | No | 10 for both | 0.160 | Shapes of the closed through holes: hexagons | Passing |
| Embodiment 6 | No | 10 for both | 0.089 | Shapes of the closed through holes: hexagons | Passing |
| Embodiment 7 | No | 10 for both | 0.065 | Shapes of the closed through holes: hexagons | Passing |
| Embodiment 8 | Yes | 5 for both | 0.034 | Shapes of the extending | Passing |

TABLE 1-continued

| | First and second extending portions | | | Shapes of the first and second extending portions/ closed through holes | Electrical test results |
|---|---|---|---|---|---|
| | Whether they are connected | Respective line widths (μm) | Contact areas (mm²) | | |
| Embodiment 9 | Yes | 5 for both | 0.057 | Shapes of the extending portions: wave | Passing |
| Embodiment 10 | Yes | 5 for both | 0.026 | Shapes of the extending portions: dumbbell | Passing |
| Embodiment 11 | Yes | 5 for both | 0.076 | Shapes of the extending portions: branches | Passing |
| | | | | Shapes of the closed through holes: hexagons | |

Figure 7:
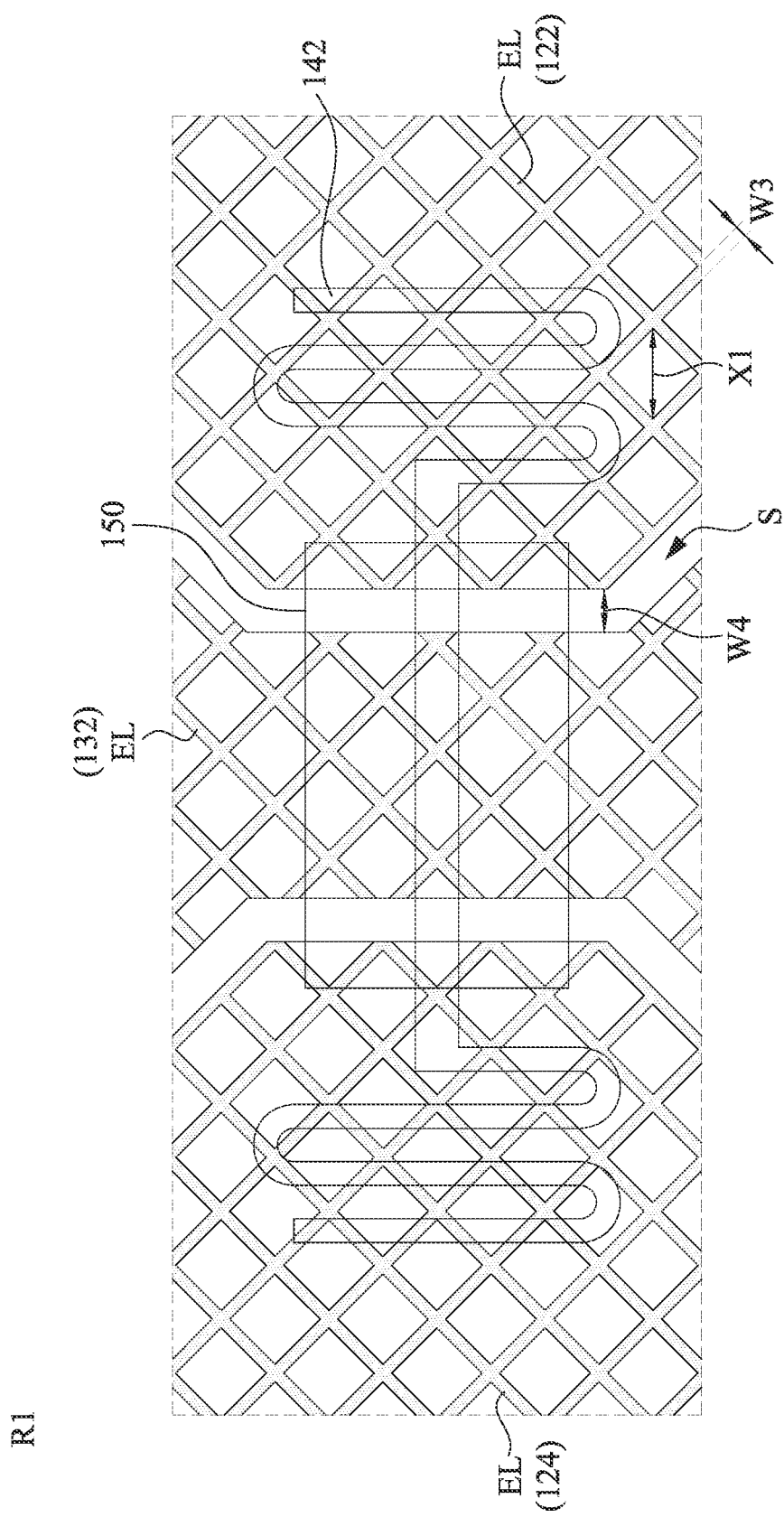
FIG. 7 is a partially enlarged perspective view of the region R1 of the touch module in FIG. 1A according to some embodiments of the present disclosure.

FIG. 7 is a partially enlarged perspective view of the region R1 of the touch module 100 in FIG. 1A according to some embodiments of the present disclosure. The touch modules 100 in FIG. 7 and FIG. 5A have substantially identical element arrangement, connection relationship, materials, and effects, while the at least one difference lies in that: in the touch module 100 in FIG. 7, each of the first horizontal touch electrode 122, the second horizontal touch electrode 124, and the first vertical touch electrode 132 has a grid pattern which is formed by interlacing a plurality of electrode lines ELs, such that a visible area VA (referring to FIG. 1A) of the touch module 100 can have good optical properties. It should be noted that, in order to clearly present the shapes of various elements, all the elements in FIG. 7 are drawn with solid lines. In some embodiments, each electrode line EL may include a matrix and a plurality of metal nanowires distributed in the matrix. In some embodiments, a width W3 (a line width) of each electrode line EL may range from 20 μm to 50 μm, so as to provide the first horizontal touch electrode 122, the second horizontal touch electrode 124, and the first vertical touch electrode 132 with good optical properties and to achieve convenient patterning. In detail, when the width W3 of the electrode line EL is greater than 50 μm, the first horizontal touch electrode 122, the second horizontal touch electrode 124, and the first vertical touch electrode 132 may have poor light transmittance, thus affecting the optical properties of the visible area VA of the touch module 100; when the width W3 of the electrode line EL is less than 20 μm, the difficulty of patterning may be increased, thus causing inconvenience in the process.

In some embodiments, a distance X1 (a line distance) between the adjacent electrode lines ELs may range from 20 μm to 30 μm, so as to provide the first horizontal touch electrode 122, the second horizontal touch electrode 124, and the first vertical touch electrode 132 with desired light transmittance and conductivity. In detail, when the distance X1 is greater than 30 μm, the grid pattern may be too sparse, causing insufficient electronic delivery paths and thus resulting in excessively high surface resistance and excessively low conductivity of the first horizontal touch electrode 122, the second horizontal touch electrode 124, and the first vertical touch electrode 132; when the distance X1 is less than 20 μm, the grid pattern may be too dense, causing excessively low light transmittance of the first horizontal touch electrode 122, the second horizontal touch electrode 124, and the first vertical touch electrode 132 and thus affecting the optical properties of the visible area VA of the touch module 100. It should be noted that the first horizontal touch electrode 122, the second horizontal touch electrode 124, and the first vertical touch electrode 132 in the foregoing different embodiments may also have a grid pattern formed by interlacing the electrode lines ELs.

Additionally, since the first horizontal touch electrode 122, the second horizontal touch electrode 124, and the first vertical touch electrode 132 take the metal nanowires as their electronic delivery paths, it is not required to additionally dispose an index-matching (IM) layer to make the etching line S in the touch module 100 maintain an invisible state. In some embodiments, by matching a width W4 of the etching line S (i.e., a gap S between the first horizontal touch electrode 122/the second horizontal touch electrode 124 and the first vertical touch electrode 132) in the touch module 100 with a wire diameter of each metal nanowire in the first horizontal touch electrode 122, the second horizontal touch electrode 124, and the first vertical touch electrode 132, the touch module 100 can meet the optical visibility requirement. More specifically, by matching the width W4 of the etching line S with the wire diameter of the metal nanowire, the etching line S, the first horizontal touch electrode 122, the second horizontal touch electrode 124, and the first vertical touch electrode 132 can maintain an invisible state, such that the visible area VA (referring to FIG. 1A) of the touch module 100 achieves an optically-consistent visual effect. In some embodiments, the width W4 of the etching line S may range from 20 μm to 30 μm, and the wire diameter of each metal nanowire may range from 10 nm to 40 nm, such that the touch module 100 meets the optical visibility requirement.

Please refer to Table 2, which specifically verifies the influence of the width W4 of the etching line S and the wire diameter of the metal nanowire on the optical visibility of the touch module 100 by using different examples. It should be noted that the optical test method used in the verification is to visually inspect a product including the touch module 100 of the present disclosure under a white light source.

TABLE 2

| Optical test results | Wire diameter of the metal nanowire | | |
|---|---|---|---|
| | 10 nm~20 nm | 20 nm~30 nm | 30 nm~40 nm |
| Width of the etching line 10 μm | OK | OK | OK |
| 15 μm | OK | OK | OK |
| 20 μm | OK | OK | OK |
| 25 μm | OK | OK | NG |
| 30 μm | OK | NG | NG |

The touch module of the present disclosure can be assembled with other electronic devices, such as a display with touch function. For example, the substrate can be bonded to a display device (e.g., a liquid crystal display device or an organic light-emitting diode display device), and optical adhesive or other adhesives can be used to bond therebetween. The touch module may also be bonded with an outer cover layer (e.g., a protective glass) through the optical adhesive. The touch module in the present disclosure can be applied to electronic devices such as portable phones, tablets, and notebooks and can also be applied to flexible products. The touch module of the present disclosure can also be applied to a polarizer, wearable devices (e.g., watches, glasses, smart clothes, and smart shoes), and automotive devices (e.g., dashboards, driving recorders, rearview mirrors, and windows).

According to the foregoing embodiments of the present disclosure, the touch module of the present disclosure includes the touch electrodes and the jumpers mutually connected. By a special design in the structure of the jumper, the metal nanowires in the touch electrode can be avoided from excessively gathering or settling near the jumper, and the low contact impedance and optical visibility requirements of the touch module can be met, thus improving the reliability of the touch module and a device manufactured thereby and further meeting product specifications. Additionally, by the design in the specifications of the etching line and the metal nanowire, the touch module achieves an optically-consistent visual effect.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch module, comprising:
a substrate;
a first horizontal touch electrode and a second horizontal touch electrode which are disposed on the substrate at intervals along a first direction;
a first jumper connected to the first horizontal touch electrode and the second horizontal touch electrode, wherein:
the first jumper has a first main portion and at least two first extending portions connected to the first main portion,
the first main portion is between the two first extending portions in the first direction,
the two first extending portions are respectively disposed corresponding to the first horizontal touch electrode and the second horizontal touch electrode,
each of the two first extending portions forms at least one opening,
a width of the first main portion and a width of each of the two first extending portions respectively ranges from 5 µm to 30 µm,
a contact area between the first horizontal touch electrode or the second horizontal touch electrode and a corresponding one of the two first extending portions ranges from 0.01 mm² to 0.30 mm²,
the opening is a closed through hole, and
a top-view outline of the closed through hole comprises a triangle, a rectangle, a circle, an oval, a polygon, or a combination thereof; and
a first vertical touch electrode disposed on the substrate, wherein the first vertical touch electrode is located between the first horizontal touch electrode and the second horizontal touch electrode in the first direction, and the first vertical touch electrode is electrically insulated from the first jumper.

2. The touch module of claim 1, wherein each of the first horizontal touch electrode and the second horizontal touch electrode has at least a portion extending to a sidewall of a corresponding one of the two first extending portions.

3. The touch module of claim 1, wherein each of the first horizontal touch electrode and the second horizontal touch electrode comprises a matrix and a plurality of metal nanowires distributed in the matrix.

4. The touch module of claim 3, wherein each of the first horizontal touch electrode and the second horizontal touch electrode is separated from the first vertical touch electrode by at least a gap, a width of the gap ranges from 20 µm to 30 µm, and a wire diameter of each of the metal nanowires ranges from 10 nm to 40 nm.

5. The touch module of claim 3, wherein each of the first horizontal touch electrode and the second horizontal touch electrode has a grid pattern formed by interlacing a plurality of electrode lines.

6. The touch module of claim 5, wherein a width of each of the electrode lines ranges from 20 µm to 50 µm, and a distance between any two adjacent electrode lines of the electrode lines ranges from 20 µm to 30 µm.

7. The touch module of claim 1, wherein a material of the first jumper comprises at least a metal, and the touch module further comprises an oxide layer covering at least one surface of the first jumper.

8. The touch module of claim 1, wherein a material of the substrate comprises alkali glass, and the touch module further comprises an isolation layer disposed between the substrate and the first horizontal touch electrode and between the substrate and the second horizontal touch electrode.

9. The touch module of claim 1, further comprising:
a third horizontal touch electrode disposed on the substrate at an interval from the second horizontal touch electrode along the first direction;
a second jumper connected to the second horizontal touch electrode and the third horizontal touch electrode, wherein the second jumper has a second main portion and at least two second extending portions connected to the second main portion, the second main portion is located between the two second extending portions in the first direction, the two second extending portions are respectively disposed corresponding to the second horizontal touch electrode and the third horizontal touch electrode, each of the two second extending portions forms at least one opening, and the first extending portion and the second extending portion corresponding to the second horizontal touch electrode are mutually connected; and
a second vertical touch electrode disposed on the substrate, wherein the second vertical touch electrode is located between the second horizontal touch electrode and the third horizontal touch electrode in the first direction, and the second vertical touch electrode is electrically insulated from the second jumper.

10. A touch module, comprising:
a substrate;
a first horizontal touch electrode and a second horizontal touch electrode which are disposed on the substrate at intervals along a first direction;
a first jumper connected to the first horizontal touch electrode and the second horizontal touch electrode, wherein:
the first jumper has a first main portion and at least two first extending portions connected to the first main portion,
the first main portion is between the two first extending portions in the first direction, each of the two first extending portions forms at least one opening,
a width of the first main portion and a width of each of the two first extending portions respectively ranges from 5 μm to 30 μm,
a contact area between the first horizontal touch electrode or the second horizontal touch electrode and a corresponding one of the two first extending portions ranges from 0.01 mm² to 0.30 mm²,
the opening is a closed through hole, and
a top-view outline of the closed through hole comprises a triangle, a rectangle, a circle, an oval, a polygon, or a combination thereof; and
a first vertical touch electrode disposed on the substrate, wherein the first vertical touch electrode is located between the first horizontal touch electrode and the second horizontal touch electrode in the first direction, and the first vertical touch electrode is electrically insulated from the first jumper.

11. The touch module of claim 10, wherein each of the first horizontal touch electrode and the second horizontal touch electrode has a grid pattern formed by interlacing a plurality of electrode lines, and each of the electrode lines comprises a matrix and a plurality of metal nanowires distributed in the matrix.

12. The touch module of claim 11, wherein each of the first horizontal touch electrode and the second horizontal touch electrode is separated from the first vertical touch electrode by at least a gap, a width of the gap ranges from 20 μm to 30 μm, and a wire diameter of each of the metal nanowires ranges from 10 nm to 40 nm.

13. The touch module of claim 10, wherein a material of the first jumper comprises at least a metal, and the touch module further comprises an oxide layer covering at least one surface of the first jumper.

14. The touch module of claim 10, wherein a material of the substrate comprises alkali glass, and the touch module further comprises at least one isolation layer disposed between the substrate and the first horizontal touch electrode and between the substrate and the second horizontal touch electrode.

15. The touch module of claim 10, wherein a width of the first jumper ranges from 5 μm to 30 μm.

16. The touch module of claim 10, further comprising an insulating layer disposed between the first horizontal touch electrode and the first jumper and between the second horizontal touch electrode and the first jumper.

17. A touch device comprising the touch module of claim 1.

18. The touch module of claim 1, wherein:
the first jumper comprises a first conductive layer, a second conductive layer, and a third conductive layer,
the second conductive layer has a different material composition than the first conductive layer and the third conductive layer, and
the second conductive layer is between the first conductive layer and the third conductive layer.

19. The touch module of claim 18, wherein:
the first conductive layer comprises molybdenum,
the second conductive layer comprises aluminum, and
the third conductive layer comprises molybdenum.

20. The touch module of claim 1, wherein a bottom of the opening is defined by one of the first horizontal touch electrode or the second horizontal touch electrode.

* * * * *